(12) United States Patent
Kim et al.

(10) Patent No.: US 11,592,939 B1
(45) Date of Patent: Feb. 28, 2023

(54) DISPLAY DEVICE WITH SYNCHRONIZED INPUT SENSING LAYER

(71) Applicant: Samsung Display Co., Ltd., Yongin-Si (KR)

(72) Inventors: Min-Hong Kim, Hwaseong-si (KR); Hyun-Wook Cho, Yongin-si (KR); Taejoon Kim, Seongnam-si (KR); Jungmok Park, Hwaseong-si (KR)

(73) Assignee: SAMSUNG DISPLAY CO., LTD., Yongin-Si (KR)

( * ) Notice: Subject to any disclaimer, the term of this patent is extended or adjusted under 35 U.S.C. 154(b) by 0 days.

(21) Appl. No.: 17/730,523

(22) Filed: Apr. 27, 2022

(30) Foreign Application Priority Data

Aug. 17, 2021 (KR) .......................... 10-2021-0108173

(51) Int. Cl.
*G06F 3/041* (2006.01)
*G09G 3/20* (2006.01)

(52) U.S. Cl.
CPC ....... *G06F 3/04184* (2019.05); *G09G 3/2096* (2013.01); *G09G 2310/08* (2013.01); *G09G 2354/00* (2013.01)

(58) Field of Classification Search
None
See application file for complete search history.

(56) References Cited

U.S. PATENT DOCUMENTS 9,477,111 B2  10/2016  Kim et al.
11,086,447 B2  8/2021  Bae et al.
2013/0069894 A1*  3/2013  Chen .................... G06F 3/0445
                                                345/173
2013/0069895 A1*  3/2013  Lo ...................... G06F 3/04184
                                                345/173
2013/0328796 A1*  12/2013  Al-Dahle ............. G06F 1/1626
                                                345/173
2014/0176488 A1*  6/2014  Jo ........................ G06F 3/0443
                                                345/174
2014/0191989 A1*  7/2014  Saitoh .................... G06F 3/044
                                                345/173

FOREIGN PATENT DOCUMENTS

KR  10-2019-0031762  3/2019
KR  10-2019-0045518  5/2019
KR  10-2019-0074776  6/2019
KR  10-2004924      10/2019

* cited by examiner

*Primary Examiner* — Chad M Dicke
(74) *Attorney, Agent, or Firm* — F. Chau & Associates, LLC

(57) ABSTRACT

Disclosed is a display device including a display panel, an input sensing layer, a display controller that drives the display panel and outputs a synchronization signal including information about an operating frequency of the display panel, and a sensing controller that receives the synchronization signal and determines an operating frequency of the input sensing layer based on the synchronization signal. A driving frame of the display panel includes a first section during which an image is not displayed and a second section during which an image is displayed. During the driving frame, the display controller transmits a data signal for displaying an image to the display panel. The synchronization signal includes a first pulse corresponding to a timing of the first section, and a second pulse corresponding to a timing of the second section.

20 Claims, 15 Drawing Sheets

DISPLAY DEVICE WITH SYNCHRONIZED INPUT SENSING LAYER

CROSS-REFERENCE TO RELATED APPLICATIONS

This application claims priority under 35 U.S.C. § 119 to Korean Patent Application No. 10-2021-0108173 filed on Aug. 17, 2021, in the Korean Intellectual Property Office, the disclosure of which is incorporated by reference herein in its entirety.

TECHNICAL FIELD

Embodiments of the present disclosure described herein relate to a display device, and more particularly, relate to a display device capable of displaying an image and detecting an external input.

DISCUSSION OF THE RELATED ART

Display devices are used in many different applications, including displaying images in multi-media devices such as televisions, mobile phones, tablet computers, navigation systems, game consoles, and the like.

Recently, there has been consumer demand for display devices capable of increased responsiveness and fluidity. Accordingly, new display devices are being driven at higher frequencies. As the display device is driven at a high frequency, power consumption of the display device increases. In some cases, the display device may change its driving frequency in response to the images and/or interface displayed on the screen. Accordingly, an operating frequency of the display device may be adjusted depending on an image displayed on the display device.

Display devices may also detect a touch-based input, so that a user may easily and intuitively enter information or commands. This provides an alternative input means to the general input schemes such as buttons, a keyboard, a mouse, or the like.

SUMMARY

Embodiments of the present disclosure provide a display device capable of reducing noise generation between a display panel and an input sensing layer.

According to an embodiment, a display device includes a display panel that displays an image and an input sensing layer disposed on the display panel and configured to sense an external input. The display device includes a display controller configured to drive the display panel and to output a synchronization signal including information about an operating frequency of the display panel. The display device includes a sensing controller configured to receive the synchronization signal from the display controller and to determine an operating frequency of the input sensing layer based on the synchronization signal. The display panel is driven according to driving frames. A driving frame of the display panel includes a first section, in which the image is not displayed on the display panel, and a second section in which the image is displayed on the display panel. The synchronization signal includes a first pulse corresponding to a timing of the first section, and a second pulse corresponding to a timing of the second section.

According to an embodiment of the present disclosure, the sensing controller may determine the operating frequency of the input sensing layer based on a duration of the first pulse.

In an embodiment of the present disclosure, when the display controller drives the display panel at a first operating frequency, the duration of the first pulse is a first duration. When the display controller drives the display panel at a second operating frequency lower than the first operating frequency, the duration of the first pulse is a second duration. The first duration may be different from the second duration.

In an embodiment of the present disclosure, the first duration may be greater than the second duration.

In an embodiment of the present disclosure, the first duration may be less than the second duration.

In an embodiment of the present disclosure, the sensing controller may determine the operating frequency of the input sensing layer based on an interval between the first pulse and the second pulse.

In an embodiment of the present disclosure, when the display controller drives the display panel at a first operating frequency, an interval between a rising edge of the first pulse and a rising edge of the second pulse is a first time interval. When the display controller drives the display panel at a second operating frequency lower than the first operating frequency, the interval between the rising edge of the first pulse and the rising edge of the second pulse is a second time interval. The first time interval may be different from the second time interval.

In an embodiment of the present disclosure, the first time interval may be greater than the second time interval.

In an embodiment of the present disclosure, the first time interval may be less than the second time interval.

In an embodiment of the present disclosure, the driving frame of the display panel further includes a third section in which the image is not displayed on the display panel. The third section is generated after the first section. The second section is between the first section and the third section.

In an embodiment of the present disclosure, the first section is period from a rising edge of the first pulse to a rising edge of the second pulse.

In an embodiment of the present disclosure, the second section begins in synchronization with a rising edge of the second pulse.

In an embodiment of the present disclosure, a sensing frame of the input sensing layer includes a non-sensing section, in which the input sensing layer does not detect the external input, and a sensing section in which the input sensing layer detects the external input. The non-sensing section corresponds to the first section, and the sensing section corresponds to the second section.

In an embodiment of the present disclosure, the display controller controls the driving of the display panel based on a vertical synchronization signal and a data enable signal. The display controller generates the synchronization signal based on the vertical synchronization signal and the data enable signal.

In an embodiment of the present disclosure, the display panel includes a base layer, a display element layer disposed on the base layer and including a plurality of pixels, and an encapsulation layer disposed on the display element layer. The input sensing layer may be directly disposed on the encapsulation layer.

According to an embodiment of the present disclosure, a display device includes a display panel that displays an image and an input sensing layer disposed on the display panel and configured to sense an external input. The display device includes a display controller configured to drive the display panel depending on a vertical synchronization signal and to output a synchronization signal based on the vertical synchronization signal. The display device includes a sensing controller receiving the synchronization signal from the display controller and to determine an operating frequency of the input sensing layer based on the synchronization signal. The synchronization signal includes operating frequency information and image display timing information.

In an embodiment of the present disclosure, a driving frame of the display panel includes a first section, in which the image is not displayed on the display panel, and a second section in which the image is displayed on the display panel. The synchronization signal includes a first pulse corresponding to a timing of the first section, and a second pulse corresponding to a timing of the second section.

In an embodiment of the present disclosure, the sensing controller determines the operating frequency of the input sensing layer based on duration of the first pulse.

In an embodiment of the present disclosure, the sensing controller may determine the operating frequency of the input sensing layer based on an interval between the first pulse and the second pulse.

In an embodiment of the present disclosure, the operating frequency of the input sensing layer is greater than the operating frequency of the display panel.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
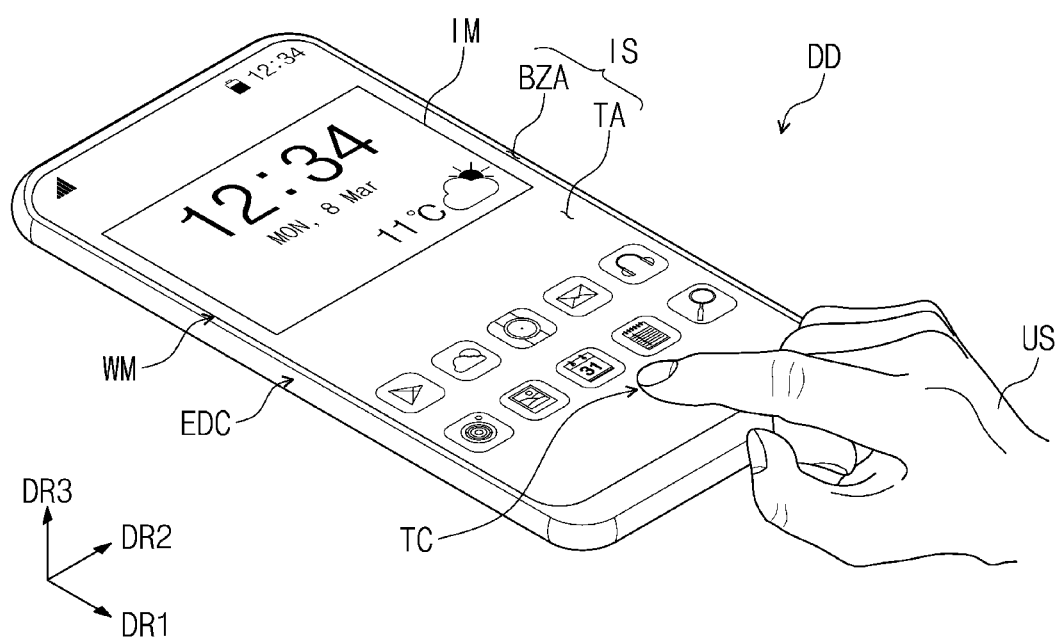
FIG. 1 is a perspective view of a display device, according to an embodiment of the present disclosure.

In the specification, the expression that a first component (or area, layer, part, portion, etc.) is "on", "connected with", or "coupled to" a second component may mean that the first component is directly on, connected with, or coupled to the second component or may mean that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, and do not preclude the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
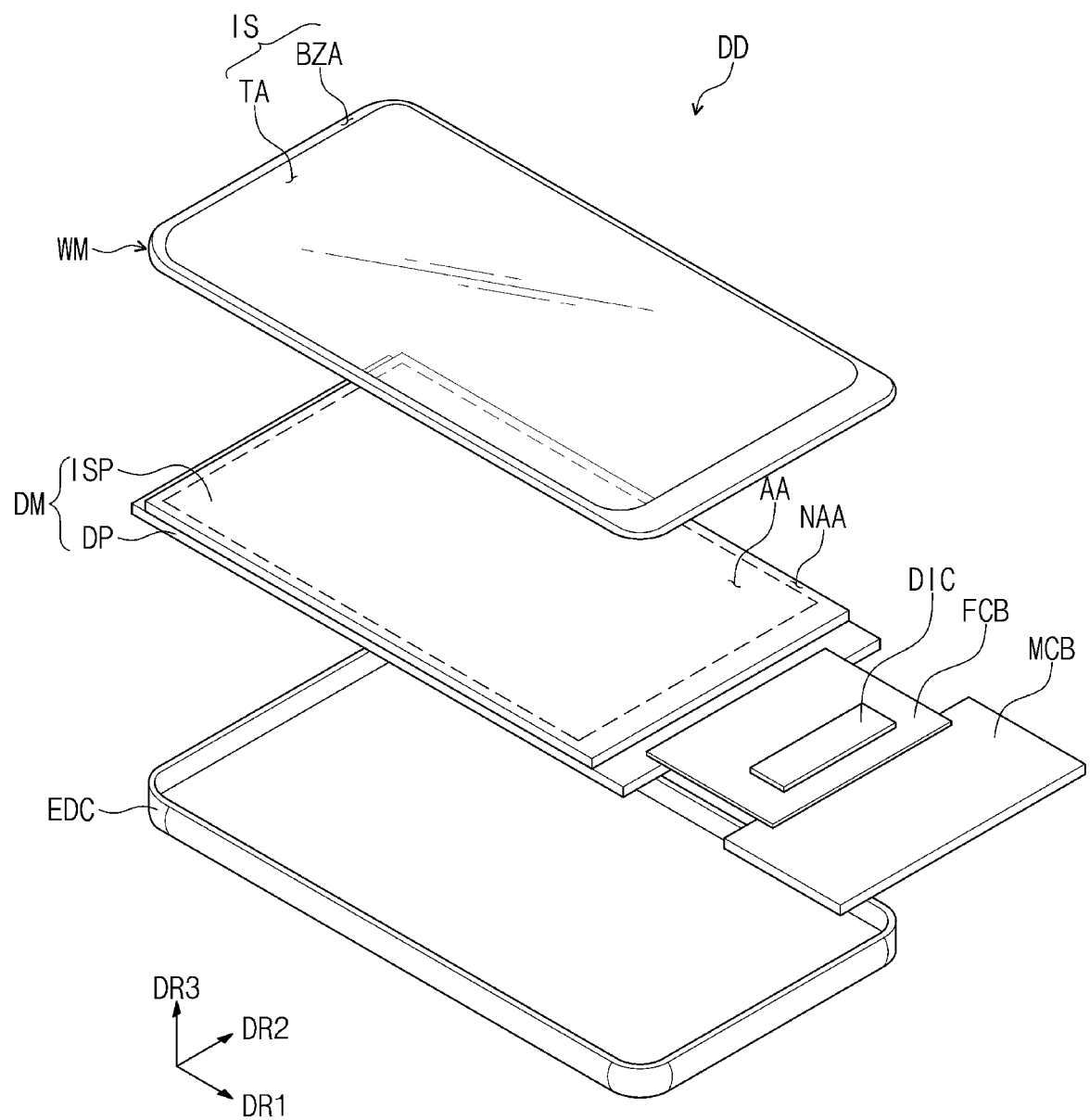
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be activated in response to an electrical signal. According to an embodiment of the present disclosure, the display device DD may be a small and medium-sized electronic device, such as a mobile phone, a tablet PC, a vehicle navigation system, a game console, or the like. The display device may DD may also be a large-sized electronic device, such as a television, a monitor, or the like. These are just presented as embodiments. It will be appreciated that the display device DD may be employed in other electronic devices as long as they do not depart from the concept of the present disclosure.

The display device DD has a rectangular shape having a long side in a first direction DR1 and a short side in a second direction DR2 that intersects in the first direction DR1. However, the shape of the display device DD is not limited to the rectangular shape with a long side. For example, the display device DD may be implemented in various shapes. The display device DD may display an image IM on a display surface IS which is parallel to both the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate are relative in concept and may be changed to different directions in different embodiments. For example, in some embodiments, the first, second, and third directions DR1, DR2, and DR3 may be orthogonal to each other, and might not be in other embodiments.

As used herein, "the outside" may describe anything external to the display device DD, or external to the component currently being described, as will be understood by the context of the description and the drawings.

The display device DD may sense an external input applied from the outside. The external input may include various types of inputs that are provided from the outside of the display device DD. The display device DD according to an embodiment of the present disclosure may sense an external input TC of a user US, which is applied from the outside. The external input TC of the user US may include various types of external inputs, such as touch from a part of the user's body, light, heat, and pressure, or a combination thereof. In an embodiment, an example in which the external input TC of the user US is a touch input by a hand of the user US is described, but the present disclosure is not limited thereto. For example, as described above, the external input TC of the user US may be provided in various ways. Also, the display device DD may sense the external input TC of the user US applied to a side surface or a rear surface of the display device DD depending on a structure of the display device DD, and accordingly the sensing of the external input TC is not limited to one embodiment.

The external input TC according to an embodiment of the present disclosure may include inputs by an input device (e.g., a stylus pen, an active pen, a touch pen, an electronic pen, an e-pen, or the like) in addition to a hand of a user US.

The front surface of the display device DD may be divided into a transparent area TA and a bezel area BZA. The transparent area TA may be an area in which the image IM is displayed. The user US perceives the image IM through the transparent area TA. In an embodiment, the transparent area TA is illustrated in the shape of a quadrangle whose vertices are rounded. However, this shape is provided as an example. The transparent area TA may have various shapes, not limited to any one embodiment.

The bezel area BZA is adjacent to the transparent area TA. The bezel area BZA may have a predetermined color. The bezel area BZA may surround the transparent area TA. For example, the bezel area BZA may surround the lateral side(s) of the transparent area TA. Accordingly, the shape of the transparent area TA may be substantially defined by the bezel area BZA. However, this is illustrated by way of example. For example, the bezel area BZA may be disposed adjacent to only one side of the transparent area TA or may be omitted. The display device DD according to an embodiment of the present disclosure may be embodied in many different implementations and is not limited to any one embodiment.

As illustrated in FIG. 2, the display device DD may include a display module DM and a window WM disposed on the display module DM. The display module DM may include a display panel DP that displays an image in response to an electrical signal and an input sensing layer ISP that transmits/receives information about the external input TC.

The display panel DP according to an embodiment of the present disclosure may be a light emitting display panel. The display panel DP may be, for example, an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc. Hereinafter, the description will be directed towards an embodiment in which the display panel DP is an organic light emitting display panel.

The display panel DP may output the image IM, and the output image may be displayed on the display surface IS.

The input sensing layer ISP may be disposed on the display panel DP to sense the external input TC. In an example of the present disclosure, an adhesive film may be interposed between the input sensing layer ISP and the display panel DP. A configuration and an operation of the input sensing layer ISP will be described with reference to FIGS. 5 and 6.

The window WM may be formed of a transparent material capable of outputting the image IM. For example, the window WM may be optically transparent, and may be formed of glass, sapphire, plastic, or the like. An example in which the window WM is implemented with a single layer is illustrated, but the present disclosure is not limited thereto. For example, the window WM may include a plurality of layers.

In an embodiment, the bezel area BZA of the display device DD described above may correspond to an area that is defined by printing a material including a given color on one area of the window WM. In an example embodiment, the window WM may include a light blocking pattern for defining the bezel area BZA. For example, the light-shielding pattern may be formed by a coating method, as a colored organic film.

The window WM may be coupled to the display module DM through an adhesive film. In an example embodiment, the adhesive film may include an optically clear adhesive (OCA) film. However, the adhesive film is not limited thereto. For example, the adhesive film may include a typical adhesive or sticking agent. For example, the adhesive film may include an optically clear resin (OCR) film or a pressure sensitive adhesive (PSA) film.

An anti-reflection layer may be further disposed between the window WM and the display module DM. The anti-reflection layer decreases reflectivity of external light incident onto the window WM. The anti-reflection layer according to an embodiment of the present disclosure may include a retarder and a polarizer. The retarder may be a retarder of a film type or a liquid crystal coating type, and may include a $\lambda/2$ retarder and/or a $\lambda/4$ retarder. The polarizer may also have a film type or a liquid crystal coating type. The film type may include a stretch-type synthetic resin film, and the liquid crystal coating type may include liquid crystals arranged in a given direction. The retarder and the polarizer may be implemented with one polarization film.

In an example embodiment, the anti-reflection layer may also include color filters. An array of color filters may be determined in consideration of colors and arrangement of lights that a plurality of pixels PX (refer to FIG. 4) included in the display panel DP generate. Also, the anti-reflection layer may further include a light blocking pattern.

The display module DM may display an image in response to an electrical signal and may transmit/receive information about an external input. The display module DM may be defined by an effective area AA and an ineffective area NAA. The effective area AA may be defined as an area through which an image provided from the display area DA is output. Additionally or alternatively, the effective area AA may be defined as an area in which the input sensing layer ISP senses the external input TC applied from the outside. However, the present disclosure is not limited thereto. For example, an area where an image provided by the display module DM is emitted may be different from an area where the input sensing layer ISP senses the external input TC applied from the outside.

The ineffective area NAA is adjacent to the effective area AA. For example, the ineffective area NAA may surround the effective area AA (e.g., the ineffective area NAA may surround lateral side(s) of the effective area AA). However, this is illustrated by way of an example. The ineffective area NAA may be formed in various shapes, and is not limited to any one embodiment. According to an embodiment, the effective area AA of the display module DM may correspond to at least part of the transparent area TA.

The display module DM may further include a main circuit board MCB, a flexible circuit film FCB, and a driver chip DIC. The main circuit board MCB may be connected with the flexible circuit film FCB so as to be electrically connected with the display panel DP. The flexible circuit film FCB may be connected with the display panel DP such that the display panel DP and the main circuit board MCB are electrically connected.

The main circuit board MCB may include a plurality of driver devices. The plurality of driver devices may include a circuit part for driving the display panel DP. The driver chip DIC may be mounted on the flexible circuit film FCB. An example of the display device DD that includes one flexible circuit film FCB is illustrated, but the present disclosure is not limited thereto. For example, the display device DD may include a plurality of flexible circuit films capable of being connected with the display panel DP. A structure in which the driver chip DIC is mounted on the flexible circuit film FCB is illustrated in FIG. 2, but the present disclosure is not limited thereto. For example, the driver chip DIC may be directly mounted on the display panel DP. In this case, a portion of the display panel DP, on which the driver chip DIC is mounted, may be bent such that the driver chip DIC is disposed on a rear surface of the display module DM. In an embodiment, the driver chip DIC may be directly mounted on the main circuit board MCB.

The input sensing layer ISP may be electrically connected with the main circuit board MCB through the flexible circuit film FCB. However, the input sensing layer ISP may be connected to the main circuit board MCB in various ways. For example, the display module DM may additionally include a separate flexible circuit film for electrically connecting the input sensing layer ISP and the main circuit board MCB.

The display device DD further includes an outer case EDC that accommodates the display module DM. The outer case EDC may be coupled with the window WM to define the exterior of the display device DD. The outer case EDC may absorb external shocks and may prevent a foreign material/moisture or the like from entering into the display module DM such that components accommodated in the outer case EDC are protected. Meanwhile, In an example embodiment, the outer case EDC may be provided in the form of a combination of a plurality of accommodating members.

The display device DD according to an embodiment may further include an electronic module that includes various functional modules for operating the display module DM, a power supply module for supplying a power necessary for overall operations of the display device DD, a bracket coupled with the display module DM and/or the outer case EDC to partition an inner space of the display device DD, etc.

Figure 3:
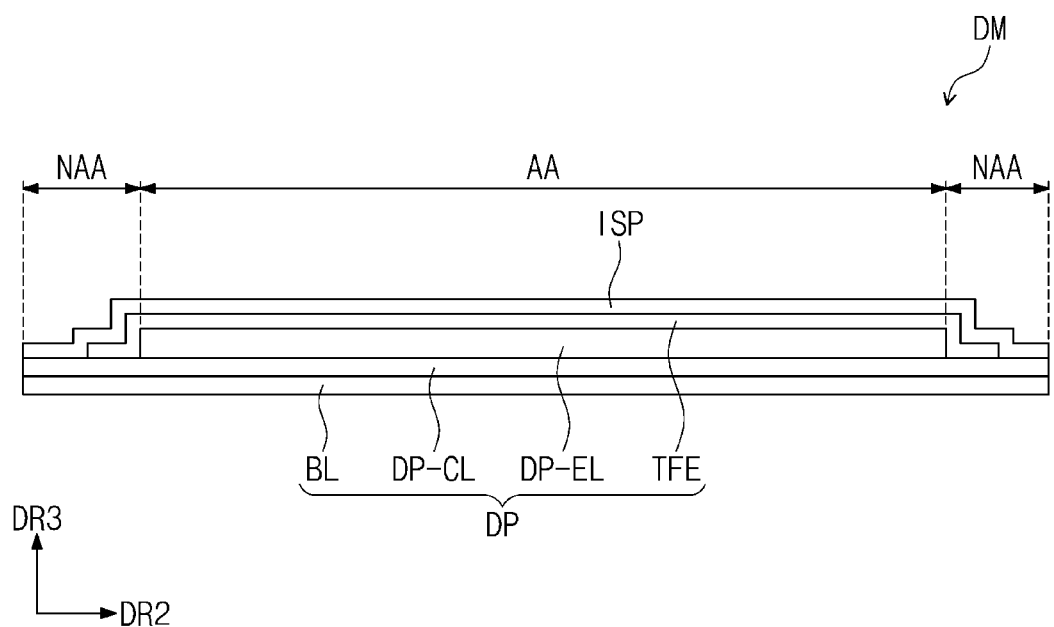
FIG. 3 is a cross-sectional view of a display module, according to an embodiment of the present disclosure.

FIG. 3 is a cross-sectional view of a display module, according to an embodiment of the present disclosure.

Referring to FIG. 3, an embodiment of the display module DM includes the display panel DP and the input sensing layer ISP. The display panel DP includes a base layer BL, a circuit element layer DP-CL disposed on the base layer BL, a display element layer DP-EL, and an encapsulation layer TFE. The display panel DP may further include functional layers such as an anti-reflection layer, a refractive-index adjustment layer, and the like.

The base layer BL may include at least one synthetic resin layer. In addition to the synthetic resin layer, the base layer BL may include a glass material layer, a metal material layer, and/or an organic/inorganic composite material layer. In an example embodiment, the base layer BL may be a flexible layer. The effective area AA and the ineffective area NAA described with reference to FIG. 2 may be equally defined in the base layer BL. For example, the area of the base layer BL may include the effective area AA and the ineffective area NAA.

The circuit element layer DP-CL includes at least one intermediate insulating layer and a circuit element. The intermediate insulating layer may include at least one intermediate inorganic layer and at least one intermediate organic layer. The circuit element includes signal lines, a driving circuit of a pixel, etc.

The display element layer DP-EL includes a light emitting element. The light emitting element may include organic light emitting diodes. The display element layer DP-EL may further include an organic film such as a pixel defining film.

The encapsulation layer TFE seals the display element layer DP-EL. The encapsulation layer TFE includes at least one inorganic layer. The encapsulation layer TFE may further include at least one organic layer. The inorganic layer protects the display element layer DP-EL from moisture/ oxygen, and the organic layer protects the display element layer DP-EL from a foreign material such as dust particles. The inorganic layer may include a silicon nitride layer, a silicon oxynitride layer and a silicon oxide layer, a titanium oxide layer, or an aluminum oxide layer. The organic layer may include, but is not necessarily limited to, an acrylic-based organic layer.

The input sensing layer ISP may be formed on the display panel DP by a sequential process. The input sensing layer ISP and the display panel DP may be coupled to each other through an adhesive film. The input sensing layer ISP may have a multilayer structure. The input sensing layer ISP may include a single insulating layer or multiple insulating layers. According to an embodiment of the present disclosure, when the input sensing layer ISP is directly disposed on the display panel DP by a sequential process, the input sensing layer ISP is directly disposed on the encapsulation layer TFE, and an adhesive film is not interposed between the input sensing layer ISP and the display panel DP. However, in another embodiment, the adhesive film may be interposed between the input sensing layer ISP and the display panel DP. In this case, the input sensing layer ISP might not be manufactured continuously in the same process with the display panel DP. For example, the input sensing layer ISP may be manufactured through a process separate from that of the display panel DP and may then be fixed on an upper surface of the display panel DP by an adhesive film.

In an embodiment of the present disclosure, the display panel DP may further include an encapsulation substrate. The encapsulation substrate may be disposed on the display element layer DP-EL so as to face the base layer BL. The encapsulation substrate may include a plastic substrate, a glass substrate, a metal substrate, or an organic/inorganic composite material substrate. A sealant may be disposed between the encapsulation substrate and the base layer BL, and the encapsulation substrate and the base layer BL may be coupled to each other by the sealant. The sealant may include an organic adhesive or a frit including a ceramic adhesive material. The display element layer DP-EL may be sealed by the sealant and the encapsulation substrate.

When the input sensing layer ISP is directly disposed on the display panel DP by a sequential process, the input sensing layer ISP may be directly disposed on the encapsulation substrate. However, in another embodiment, when an adhesive film is disposed between the input sensing layer ISP and the display panel DP, the input sensing layer ISP may be fixed on the upper surface of the encapsulation substrate by the adhesive film.

Figure 4:
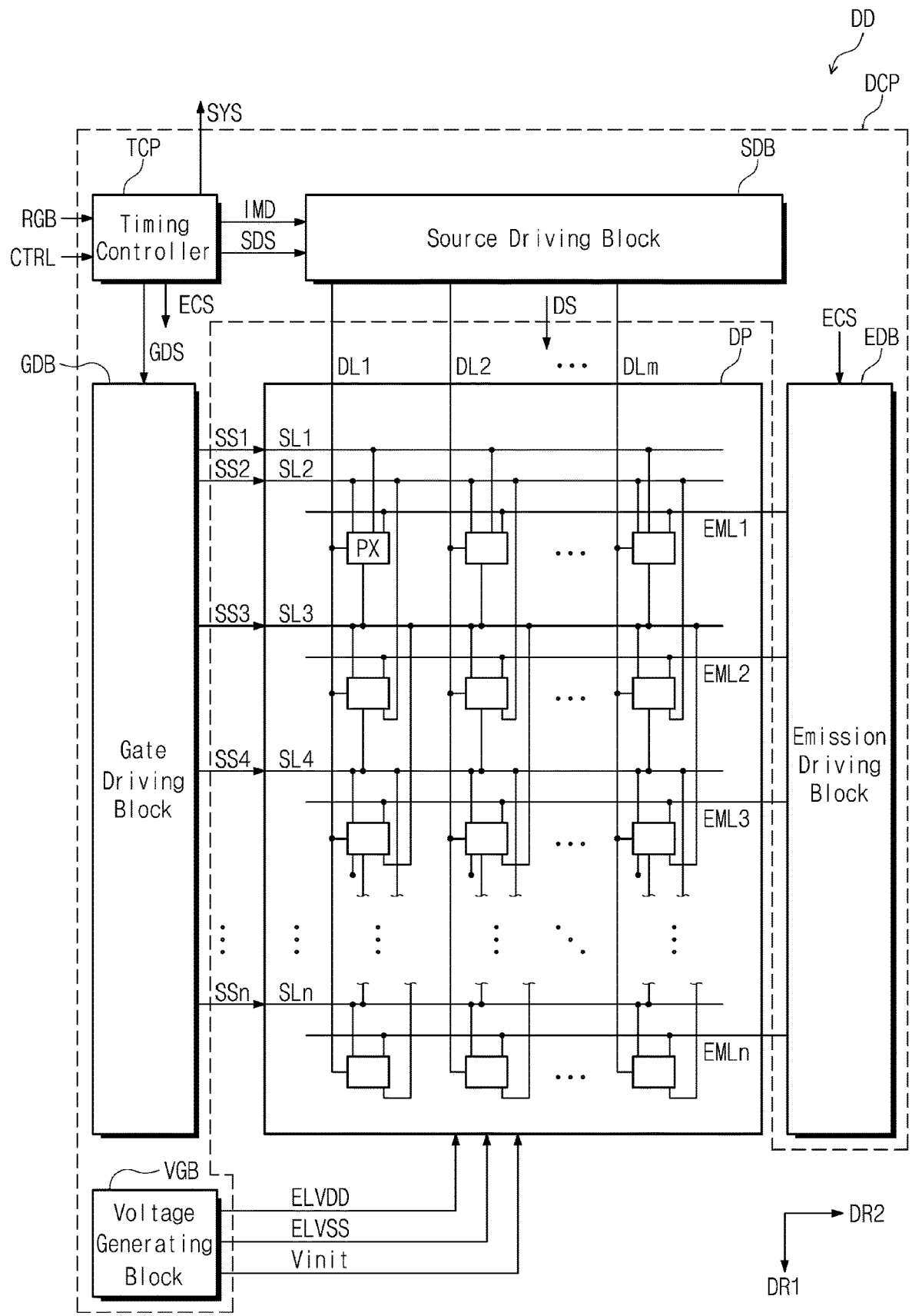
FIG. 4 is a block diagram of a display device, according to an embodiment of the present disclosure.

FIG. 4 is a block diagram of a display device, according to an embodiment of the present disclosure.

Referring to FIG. 4, the display device DD includes the display panel DP and a display controller DCP. The display controller DCP controls the driving of the display panel DP.

In an embodiment of the present disclosure, the display controller DCP includes a timing controller TCP, a source driving block SDB, a gate driving block GDB, an emission driving block EDB, and a voltage generating block VGB.

The timing controller TCP receives an image signal RGB and an external control signal CTRL from the outside (e.g., from a component outside of the display controller DCP). The timing controller TCP generates image data IMD by converting a data format of the image signal RGB in compliance with the specification for an interface with the source driving block SDB. The timing controller TCP generates a source driving signal SDS, a gate driving signal GDS, and an emission control signal ECS based on the external control signal CTRL. The external control signal CTRL may include a main clock or the like. The timing controller TCP may transmit the image data IMD and the source driving signal SDS to the source driving block SDB. The source driving signal SDS may include a horizontal synchronization start signal for starting an operation of the source driving block SDB. In response to the source driving signal SDS, the source driving block SDB generates a data signal DS based on the image data IMD. The source driving block SDB outputs the data signal DS to a plurality of data lines DL1 to DLm, which will be described in further detail later. The data signal DS may contain an analog voltage corresponding to a gray scale value of the image data IMD.

The timing controller TCP transmits the gate driving signal GDS to the gate driving block GDB. The gate driving signal GDS may include a vertical synchronization start signal for starting an operation of the gate driving block GDB, a scan clock signal for determining the output timing of each of scan signals SS1 to SSn, and other driving signals. The gate driving block GDB generates the scan signals SS1 to SSn based on the gate driving signal GDS. The gate driving block GDB outputs the scan signals SS1 to SSn to a plurality of scan lines SL1 to SLn respectively. The plurality of scan lines SL1 to SLn will be described in further detail later.

The timing controller TCP transmits the emission control signal ECS to the emission driving block EDB. The light emitting driving block EDB may output light emission control signals to emission lines EML1 to EMLn in response to the light emission control signal ECS.

The voltage generating block VGB generates voltages necessary for an operation of the display panel DP. In an example embodiment, the voltage generating block VGB generates a first driving voltage ELVDD, a second driving voltage ELVSS, and an initialization voltage Vinit. In an example embodiment, the voltage generating block VGB may operate under control of the timing controller TCP. In an example embodiment, a voltage level of the first driving voltage ELVDD is greater than a voltage level of the second driving voltage ELVSS. In an example embodiment, the voltage level of the first driving voltage ELVDD may be about 3 V to 6 V. The voltage level of the second driving voltage ELVSS may be approximately 0 V to −3 V. A voltage level of the initialization voltage Vinit may be less than the voltage level of the second driving voltage ELVSS. For example, the voltage level of the initialization voltage Vinit may be about −3.1 V to −6 V. However, the present disclosure is not limited thereto. For example, the voltage levels of the first driving voltage ELVDD, the second driving voltage ELVSS, and the initialization voltage Vinit, which are generated by the voltage generating block VGB, may vary depending on shapes of the display device DD and the display panel DP.

In an example embodiment, the display panel DP includes the plurality of scan lines SL1 to SLn, the plurality of data lines DL1 to DLm, the plurality of emission lines EML1 to EMLn, and a plurality of pixels PX.

The scan lines SL1 to SLn extend from the gate driving block GDB in the second direction DR2 and are spaced apart from each other in the first direction DR1. The data lines DL1 to DLm extend from the source driving block SDB in the first direction DR1 and are spaced apart from each other in the second direction DR2.

Each of the pixels PX is electrically connected with three corresponding scan lines among the scan lines SL1 to SLn. Also, each of the pixels PX is electrically connected with one corresponding emission line among the emission lines EML1 to EMLn and one corresponding data line among the data lines DL1 to DLm. For example, as illustrated in FIG. 4, a first row of pixels may be connected with the first to third scan lines SL1, SL2, and SL3, the first emission line EML1, and the first data line DL1. However, a connection relationship between the pixels PX and the scan lines SL1 to SLn, the data lines DL1 to DLm, and the emission lines EML1 to EMLn may be changed according to configurations of circuits driving the pixels PX.

Each of the pixels PX includes a light emitting diode and a pixel circuit part that controls an emission operation of the light emitting diode. The pixel circuit part may include a plurality of transistors and a capacitor. Each of the pixels PX receives the first driving voltage ELVDD, the second driving voltage ELVSS, and the initialization voltage Vinit.

The pixels PX may include a plurality of groups, each of which has light emitting diodes that generate light of different colors from each other. For example, the pixels PX may include red pixels that generate red color light, green pixels that generate green color light, and blue pixels that generate blue color light. A light emitting diode of a red pixel, a light emitting diode of a green pixel, and a light emitting diode of a blue pixel may include emission layers with different materials. In an example embodiment, each of the pixels PX may include white pixels that generate white color light. In this case, an anti-reflection layer included in the display device DD may further include color filters. The display device DD may display the image IM (see FIG. 1) based on light that is output after the white color light passes through the color filters. In an example embodiment, the pixels PX may be composed of blue pixels that generate blue color light. In this case, the display device DD may display the image IM based on light output after the blue color light passes through the color filters. In an example embodiment, when the blue color light passes through the color filters, the passed light may have a color with a wavelength that is different from that of the blue color light. In an example embodiment, each of the color filters may include a quantum dot. The quantum dot is a particle capable of controlling the wavelength of light emitted by converting the wavelength of incident light. The quantum dot may control the wavelength of light emitted depending on a particle size. Accordingly, the quantum dot may emit light having a red color light, a green color light, and a blue color light.

The display controller DCP generates a synchronization signal SYS including information about an operating frequency of the display panel DP. In an example embodiment, the duration of a driving frame DF (see FIG. 9A) of the display panel DP may vary depending on the operating frequency of the display panel DP. Hereinafter, for convenience of description, when the display panel DP operates at a first operating frequency, the driving frame of the display panel DP is referred to as a "first driving frame"; and, when the display panel DP operates at a second operating frequency, the driving frame of the display panel DP is referred to as a "second driving frame".

Figure 7:
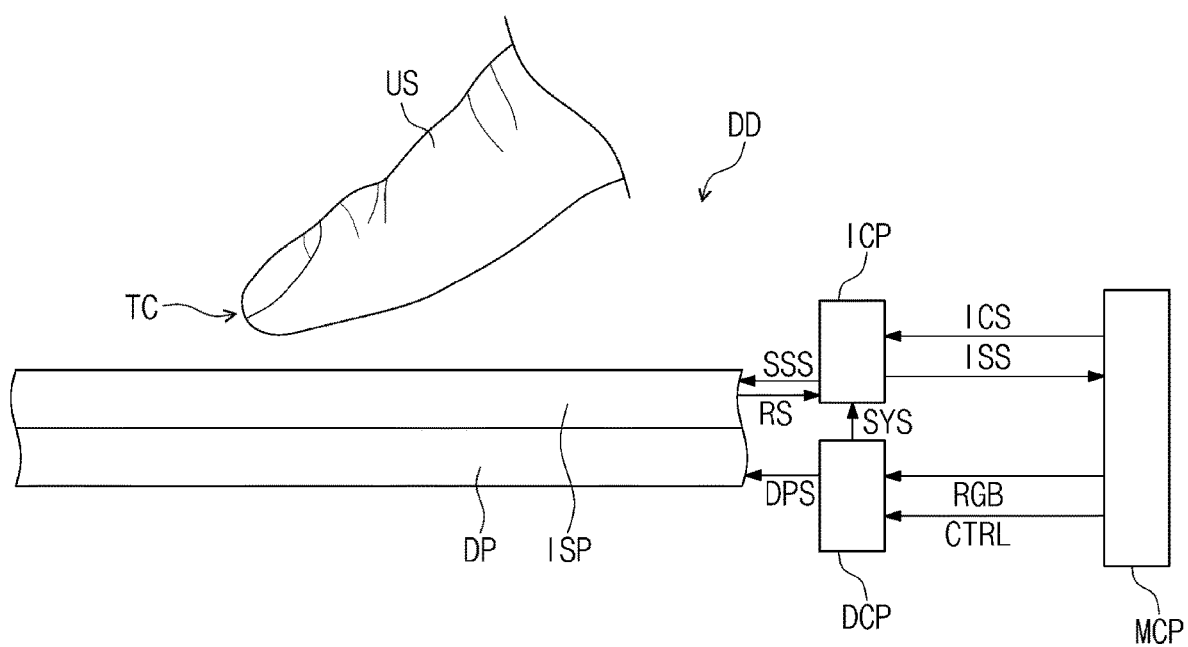
FIG. 7 is a block diagram that illustrates a display device, according to an embodiment of the present disclosure.

The display controller DCP transmits the synchronization signal SYS to a sensing controller ICP (see FIG. 7). In an example embodiment, the synchronization signal SYS may be generated by the timing controller TCP.

Figure 5:
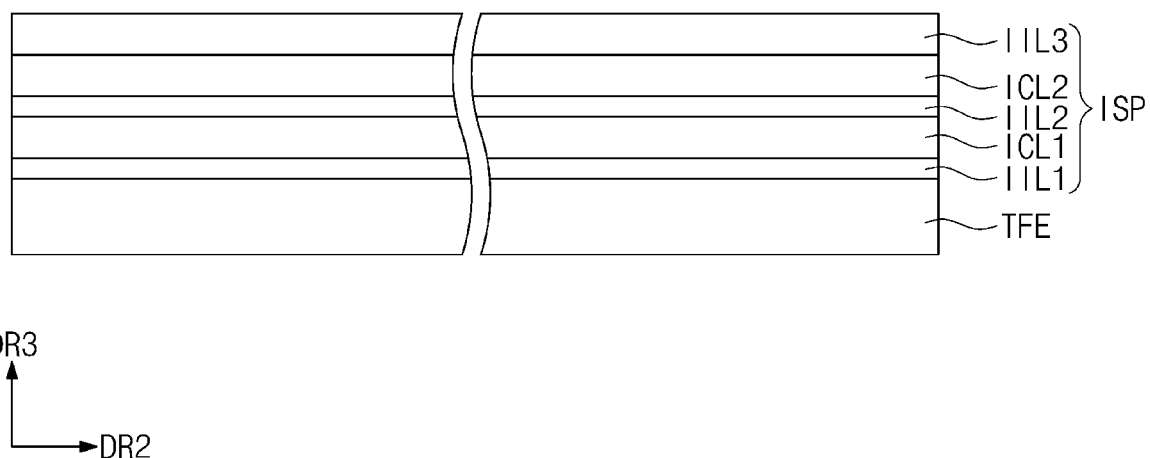
FIG. 5 is a cross-sectional view that illustrates a configuration of an input sensing layer, according to an embodiment of the present disclosure.

FIG. 5 is a cross-sectional view that illustrates a configuration of an input sensing layer, according to an embodiment of the present disclosure.

Referring to FIG. 5, the input sensing layer ISP according to an embodiment of the present disclosure may include a first sensing insulating layer IIL1, a first conductive layer ICL1, a second sensing insulating layer IIL2, a second conductive layer ICL2, and a third sensing insulating layer IIL3. The first sensing insulating layer IIL1 may be directly disposed on the encapsulation layer TFE. However, in some embodiments of the present disclosure, the first sensing insulating layer IIL1 may be omitted.

Each of the first conductive layer ICL1 and the second conductive layer ICL2 includes a plurality of conductive patterns. The conductive patterns may include a plurality of sensing electrodes, for example, SE1_1 to SE1_5 and SE2_1 to SE2_4 (see FIG. 6), and a plurality of signal lines, for example SL1_1 to SL1_5 and SL2_1 to SL2_4 (see FIG. 6), respectively connected to the plurality of sensing electrodes SE1_1 to SE1_5 and SE2_1 to SE2_4.

Each of the first to third sensing insulating layers IIL1 to IIL3 may include an inorganic material or an organic material. In an embodiment, the first sensing insulating layer IIL1 and the second sensing insulating layer IIL2 may be inorganic layers. The inorganic layer may include aluminum oxide, titanium oxide, silicon oxide, silicon oxynitride, zirconium oxide, and/or hafnium oxide. The thickness of the inorganic layer may be between 1000 angstroms and 4000 angstroms.

The third sensing insulating layer IIL3 may be an organic layer. The organic layer may include acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, and/or perylene-based resin. The third sensing insulating layer IIL3, which includes an organic material, may prevent moisture or the like from entering into the first conductive layer ICL1 and the second conductive layer ICL2 from the outside.

Figure 6:
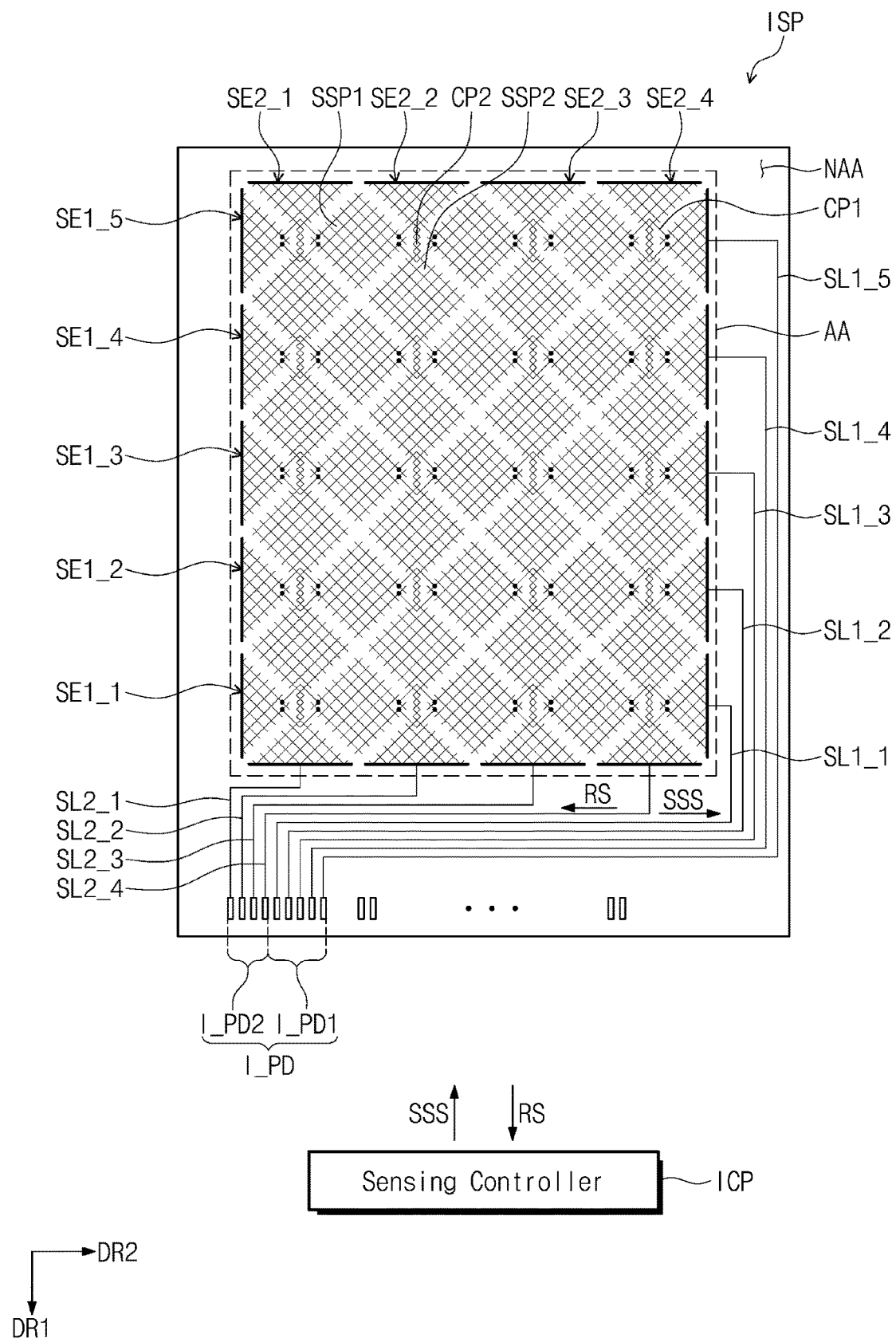
FIG. 6 is a plan view that illustrates a configuration of a sensing controller and an input sensing layer, according to an embodiment of the present disclosure.

FIG. 6 is a plan view that illustrates a configuration of a sensing controller and an input sensing layer, according to an embodiment of the present disclosure.

Referring to FIG. 6, the input sensing layer ISP according to an embodiment of the present disclosure includes the effective area AA and the ineffective area NAA adjacent to the effective area AA. The plurality of sensing electrodes SE1_1 to SE1_5 and SE2_1 to SE2_4 may be disposed in the effective area AA. The plurality of signal lines SL1_1 to SL1_5 and SL2_1 to SL2_4 may be disposed in the ineffective area NAA.

In an example embodiment, the sensing electrodes SE1_1 to SE1_5 and SE2_1 to SE2_4 include transmission electrodes SE1_1 to SE1_5 and reception electrodes SE2_1 and SE2_4.

The signal lines SL1_1 to SL1_5 and SL2_1 to SL2_4 may include the transmission signal lines SL1_1 to SL1_5 respectively connected to the transmission electrodes SE1_1 to SE1_5 and the reception signal lines SL2_1 to SL2_4 respectively connected to the reception electrodes SE2_1 to SE2_4.

The transmission electrodes SE1_1 to SE1_5 and the reception electrodes SE2_1 to SE2_4 may be arranged to cross each other. The transmission electrodes SE1_1 to SE1_5 are arranged in the first direction DR1 and extend in the second direction DR2. The reception electrodes SE2_1 to SE2_4 are arranged in the second direction DR2 and extend in the first direction DR1.

The input sensing layer ISP described above may obtain coordinate information in a mutual-capacitance manner. A capacitance is formed between the transmission electrodes SE1_1 to SE1_5 and the reception electrodes SE2_1 to SE2_4. The capacitance between the transmission electrodes SE1_1 to SE1_5 and the reception electrodes SE2_1 to SE2_4 may be changed by the external input TC (see FIG. 1) by, for example, the body of the user US (see FIG. 1). In an embodiment of the present disclosure, the capacitance between the transmission electrodes SE1_1 to SE1_5 and the reception electrodes SE2_1 to SE2_4 may be changed by an external input caused by an input device other than the body of the user US. The location of the external input TC (e.g., a touch) may be determined by corresponding the change in capacitance to the location of the transmission electrodes SE1_1 to SE1_5 and the reception electrodes SE2_1 to SE2_4. Herein, the sensing sensitivity of the input sensing layer ISP may be determined depending on the amount of change in capacitance.

However, the present disclosure is not limited thereto, and the input sensing layer ISP may obtain coordinate information in a self-capacitance method. For example, in an embodiment, one of the transmission electrodes SE1_1 to SE1_5 and one of the reception electrodes SE2_1 to SE2_4 may be integrated into one sensing electrode so as to sense the external input TC.

Each of the transmission electrodes SE1_1 to SE1_5 includes first sensor parts SSP1 and first connecting parts CP1, which are disposed in the effective area AA. In an example embodiment, the first connecting parts CP1 connect the first sensor parts SSP1 that are adjacent to the first connecting parts CP1, respectively. The first sensor parts SSP1 included in one transmission electrode may be connected to the first connecting parts CP1 so as to extend in the second direction DR2. In an example embodiment, the second connecting parts CP2 connect the second sensor parts SSP2 that are adjacent to the second connecting parts CP2, respectively. The second sensor parts SSP2 included in one reception electrode may be connected to the second connecting parts CP2 so as to extend in the first direction DR1. Two first sensor parts disposed at opposite ends of one transmission electrode among the first sensor parts SSP1 may have a smaller size (e.g., ½ size) than a first sensor part disposed at the center. Each of two second sensor parts disposed at opposite ends of one reception electrode among the second sensor parts SSP2 may have a smaller size (e.g., ½ size) than a second sensor part disposed at the center. For example, the center sensor parts may have a full rhombus shape, and the sensor parts disposed at opposite ends of the transmission electrodes and/or the reception electrodes may have a half-rhombus (e.g., a triangular) shape. See FIG. 6.

FIG. 6 illustrates the transmission electrodes SE1_1 to SE1_5 and the reception electrodes SE2_1 to SE2_4, according to an embodiment. However, the shapes thereof are not limited thereto. In an embodiment of the present disclosure, each of the transmission electrodes SE1_1 to SE1_5 or each of the reception electrodes SE2_1 to SE2_4 may have a shape (e.g., a bar shape) in which a sensor part and a connecting part are not distinguished from each other. It is illustrated that each of the first sensor parts SSP1 or each of the second sensor parts SSP2 has a shape of a rhombus, but is not limited thereto. For example, the first sensor parts SSP1 and the second sensor parts SSP2 may have different polygonal shapes.

Each of the transmission electrodes SE1_1 to SE1_5 and the reception electrodes SE2_1 to SE2_4 may have a mesh shape. As each of the transmission electrodes SE1_1 to SE1_5 and the reception electrodes SE2_1 to SE2_4 has a mesh shape, a parasitic capacitance with electrodes included in the display panel DP (refer to FIG. 2) may decrease. Accordingly, the electrodes included in the display panel DP may have increased sensitivity.

The mesh-shaped transmission electrodes SE1_1 to SE1_5 and the mesh-shaped reception electrodes SE2_1 to SE2_4 may include, but are not limited to, silver, aluminum, copper, chromium, nickel, titanium, etc.

The transmission signal lines SL1_1 to SL1_5 and the reception signal lines SL2_1 to SL2_4 may be disposed in the ineffective area NAA.

The input sensing layer ISP may include input pads I_PD, which extend from ends of the transmission signal lines SL1_1 to SL1_5 and the reception signal lines SL2_1 to SL2_4, and which are disposed in the ineffective area NAA. The input pads I_PD may be electrically connected to the transmission signal lines SL1_1 to SL1_5 and the reception signal lines SL2_1 to SL2_4. In an embodiment of the present disclosure, the input pads I_PD may include transmission input pads I_PD1, to which the transmission signal lines SL1_1 to SL1_5 are electrically connected, and reception input pads I_PD2 to which the reception signal lines SL2_1 to SL2_4 are electrically connected.

The display device DD (see FIG. 7) may further include a sensing controller ICP that controls the driving of the input sensing layer ISP.

In an example embodiment, the sensing controller ICP may be electrically connected with the input sensing layer ISP. The sensing controller ICP may be electrically connected to the transmission signal lines SL1_1 to SL1_5 and the reception signal lines SL2_1 to SL2_4 through the input pads I_PD.

In an example operation of the display device DD, the sensing controller ICP transmits a sensing scan signal SSS to the transmission electrodes SE1_1 to SE1_5 and receives response signals RS, to which a capacitance change amount between the transmission electrodes SE1_1 to SE1_5 and the reception electrodes SE2_1 to SE2_4 is reflected, from the reception electrodes SE2_1 to SE2_4. The sensing scan signal SSS may be sequentially transmitted to each of the transmission electrodes SE1_1 to SE1_5. However, in an example embodiment, the sensing scan signal SSS may be simultaneously transmitted to at least two transmission electrodes.

FIG. 7 is a block diagram that illustrates a display device, according to an embodiment of the present disclosure.

Referring to FIG. 7, the display device DD may include the display panel DP, the input sensing layer ISP, a main controller MCP, the display controller DCP, and the sensing controller ICP.

The input sensing layer ISP is disposed on the display panel DP so as to sense an external input. The input sensing layer ISP may sense the external input TC by a body or an instrument of the user US.

The main controller MCP may control the overall operation of the display device DD. In an embodiment of the present disclosure, the main controller MCP may control operations of the display controller DCP and the sensing controller ICP.

The display controller DCP may receive the image signal RGB and the external control signal CTRL from the main controller MCP. The display controller DCP may generate display signals DPS for driving the display panel DP based on the image signal RGB and the external control signal CTRL. In an embodiment of the present disclosure, the display signals DPS may include the data signal DS (see FIG. 4) and the scan signals SS1 to SSn (see FIG. 4). Furthermore, the display controller DCP may generate the synchronization signal SYS based on the external control signal CTRL. As will be described below, the synchronization signal SYS may be transmitted to the sensing controller ICP.

The sensing controller ICP may control the input sensing layer ISP. The sensing controller ICP receives a sensing control signal ICS from the main controller MCP, and receives the synchronization signal SYS from the display controller DCP. The sensing control signal ICS may include a sensing clock signal, a signal including information about a relationship between an operating frequency of the input sensing layer ISP and an operating frequency of the display panel DP, or the like. In an example embodiment, the duration of a sensing frame SF_a1 (see FIG. 10B) of the input sensing layer ISP may vary depending on an operating frequency of the input sensing layer ISP. Hereinafter, for convenience of description, when the input sensing layer ISP operates at the first operating frequency, a sensing frame of the input sensing layer ISP is referred to as a "first sensing frame", and, when the input sensing layer ISP operates at a second operating frequency, a sensing frame of the input sensing layer ISP is referred to as a "second sensing frame".

In an example embodiment, the sensing control signal ICS may be a signal which is controlled such that the operating frequency of the input sensing layer ISP is linked to the operating frequency of the display panel DP. In an example embodiment, the sensing control signal ICS may include a signal set such that the operating frequency of the input sensing layer ISP is twice the operating frequency of the display panel DP. For example, when the operating frequency of the display panel DP is 120 Hertz (Hz), the operating frequency of the input sensing layer ISP may be 240 Hz. For another example, when the operating frequency of the display panel DP is 60 Hz, the operating frequency of the input sensing layer ISP may be 120 Hz.

However, the present disclosure is not limited thereto. For example, when it is determined that the operating frequency of the display panel DP is 120 Hz, based on a signal obtained by setting the relationship between the operating frequency of the display panel DP and the operating frequency of the input sensing layer ISP included in the sensing control signal ICS, the operating frequency of the driving control signal may be 200 Hz.

The synchronization signal SYS may include information about the operating frequency of the display panel DP and information about a section DPR2 (for example, a time period, see FIG. 9A) in which the display controller DCP transmits the data signal DS for displaying the image IM (see FIG. 1) to the display panel DP. The sensing controller ICP may obtain information about an operating frequency of the display panel DP and information about a section where the image IM is displayed on the display panel DP by using the single synchronization signal SYS, and thus there is no need to receive a vertical synchronization signal Vsync (see FIG. 8) and a horizontal synchronization signal Hsync (see FIG. 8) from the display controller DCP. Moreover, when the operating frequency of the display panel DP is changed, the changed operating frequency information of the display panel DP may be reflected in the synchronization signal SYS, and thus the input sensing layer ISP may be driven without delay in conjunction with the operating frequency of the display panel DP. In an embodiment of the present disclosure, there is no need to receive a separate signal for transmitting operating frequency change information of the display panel DP to the sensing controller ICP. Accordingly, the number of physical pins required to transmit a signal from the display controller DCP to the sensing controller ICP may be reduced.

Hereinafter, the detailed description of the synchronization signal SYS will be described later with reference to FIGS. 8 to 11B.

The sensing controller ICP determines the operating frequency of the input sensing layer ISP based on the sensing control signal ICS and the synchronization signal SYS and generates the sensing scan signal SSS. The sensing controller ICP transmits the sensing scan signal SSS to the input sensing layer ISP so that the input sensing layer ISP operates at the determined operating frequency.

The sensing controller ICP receives the response signals RS from the input sensing layer ISP. The sensing controller ICP may calculate coordinate information of the external input TC based on the response signals RS, and may provide a coordinate signal ISS having the coordinate information to the main controller MCP. The main controller MCP executes an operation corresponding to the external input TC of the user US based on the coordinate signal ISS. For example, the main controller MCP may operate the display controller DCP such that a new image is displayed on the display panel DP based on the coordinate signal ISS.

Figure 8:
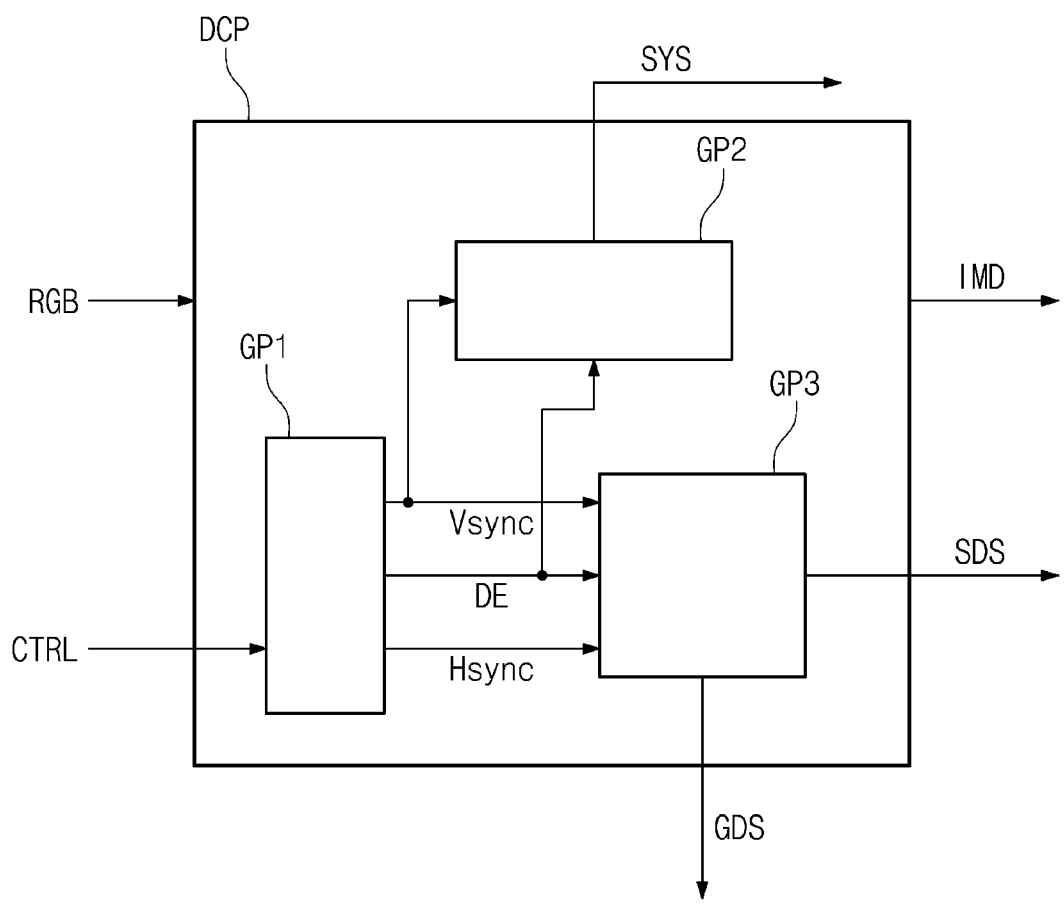
FIG. 8 is a block diagram that illustrates a display controller and a synchronization signal, according to an embodiment of the present disclosure.
Figure 9A:
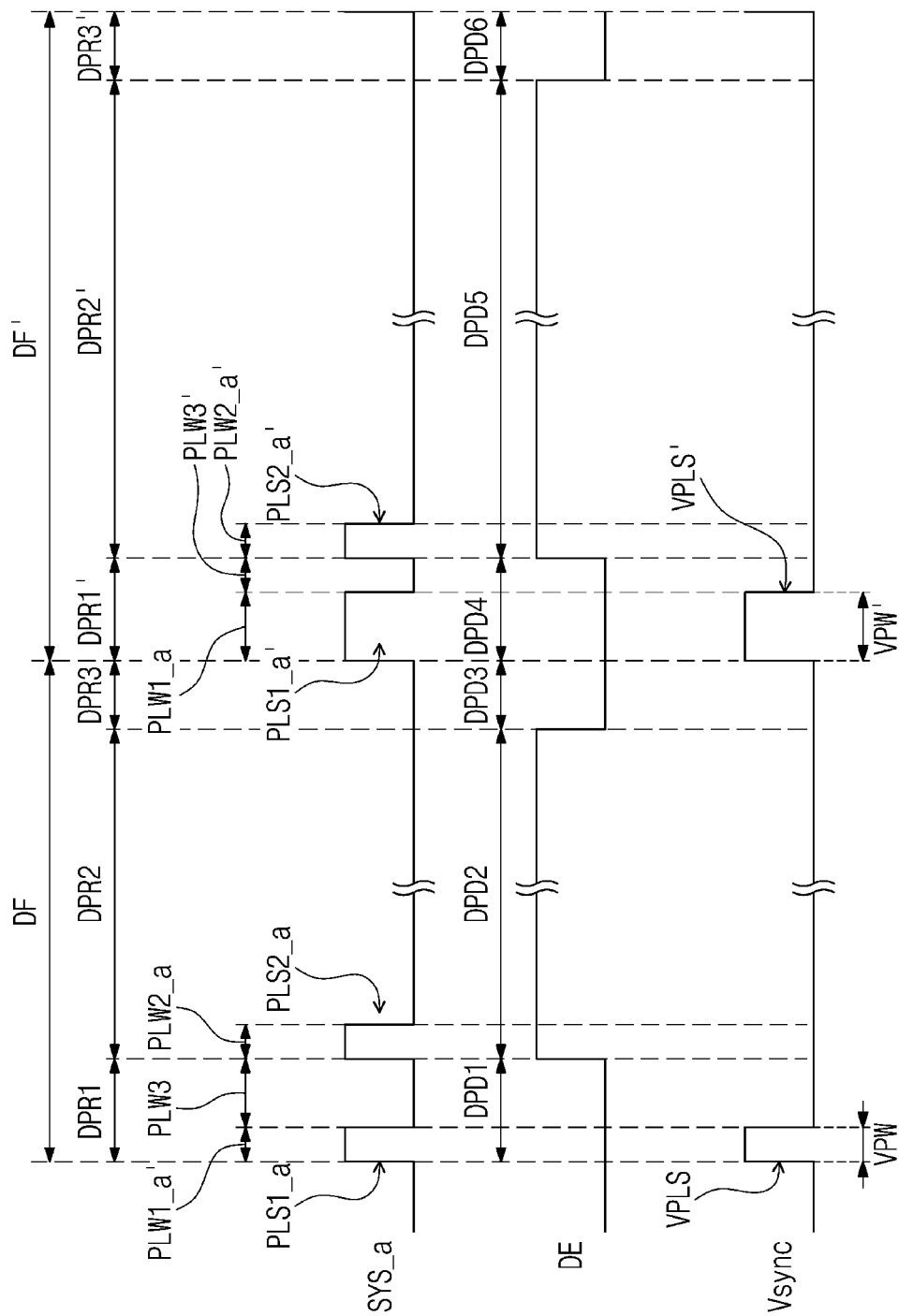
FIGS. 9A and 9B are waveform diagrams that illustrate a vertical synchronization signal, a data enable signal, and a synchronization signal, according to an embodiment of the present disclosure.
Figure 9B:
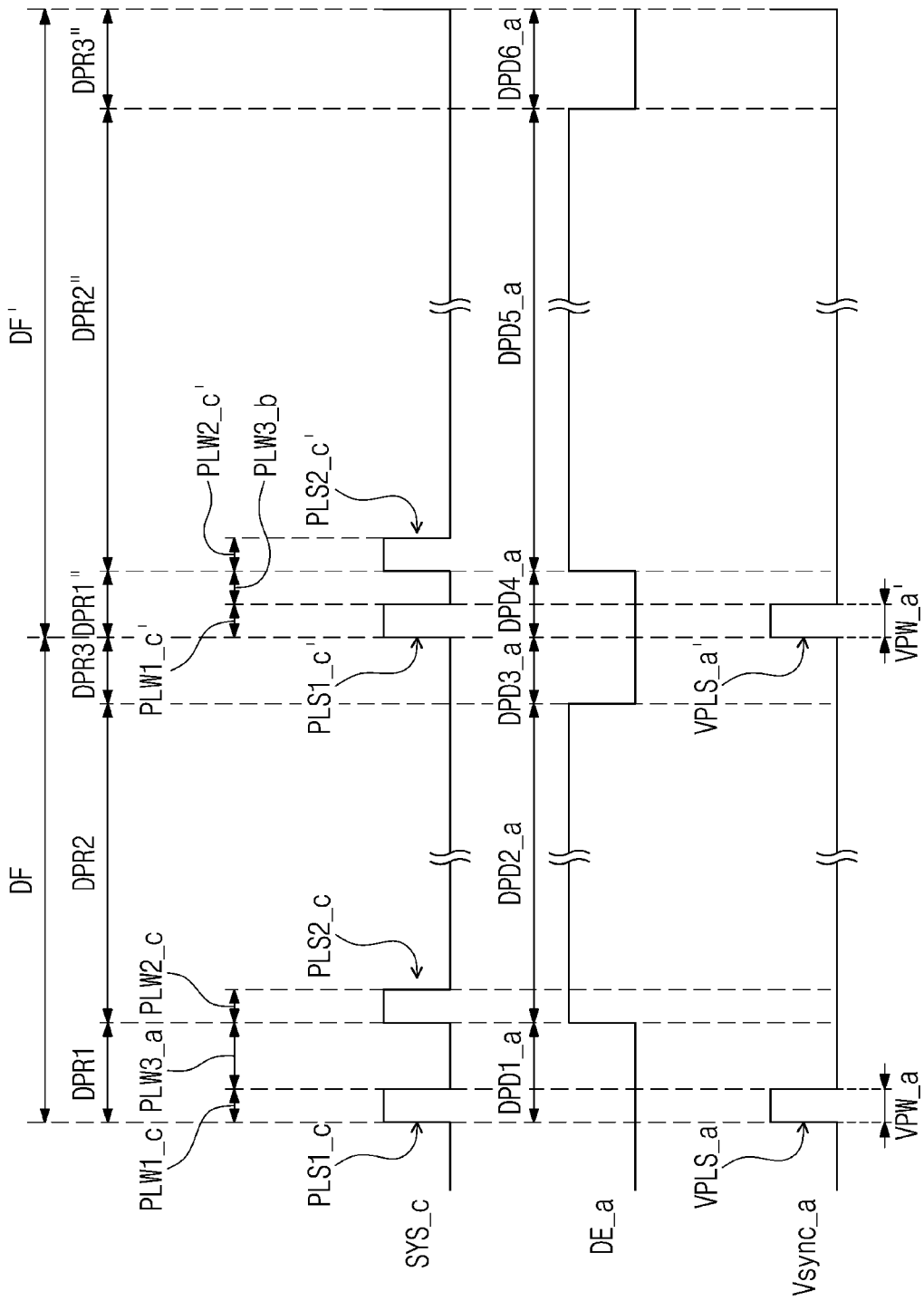

FIG. 8 is a block diagram that illustrates a display controller and a synchronization signal, according to an embodiment of the present disclosure. FIGS. 9A and 9B are waveform diagrams that illustrate a vertical synchronization signal, a data enable signal, and a synchronization signal, according to an embodiment of the present disclosure.

Referring to FIG. 8, the display controller DCP includes a first generating part GP1, a second generating part GP2, and a third generating part GP3. In an example embodiment, the first to third generating parts GP1, GP2, and GP3 may be included in the timing controller TCP (see FIG. 4). The first, second, and third generating parts GP1 through GP3 may be implemented in separate circuits, and/or may be formed as a single package, etc. Hereinafter, signals the same as the signals described with reference to FIG. 4 are marked by the same reference numerals, and thus, additional description will be omitted to avoid redundancy.

The first generating part GP1 receives the external control signal CTRL and then generates a vertical synchronization signal Vsync, a horizontal synchronization signal Hsync, and a data enable signal DE based on the external control signal CTRL. In an example embodiment, the vertical synchronization signal Vsync may determine the operating frequency of the display panel DP. The data enable signal DE may be a signal, which is used to determine a second section DPR2 (see FIG. 9A), in which the display controller DCP transmits the data signal DS (see FIG. 4) for displaying the image IM (see FIG. 1) to the display panel DP (see FIG. 2) within one driving frame DF of the display panel DP. The data enable signal DE may determine a section in which an image is displayed on the display panel DP.

The second generating part GP2 may receive the vertical synchronization signal Vsync and the data enable signal DE from the first generating part GP1. The second generating part GP2 may generate the synchronization signal SYS based on the vertical synchronization signal Vsync and the data enable signal DE. The second generating part GP2 may generate the synchronization signal SYS in synchronization with a vertical pulse VPLS (see FIG. 9A) included in the vertical synchronization signal Vsync and a first activation section DPD2 of the data enable signal DE.

Referring to FIGS. 8 and 9A, when the display panel DP operates at a first operating frequency, the first driving frame DF includes a first section DPR1 and a second section DPR2.

In an example embodiment, the first section DPR1 may be a time period in which the image IM is not displayed on the display panel DP. The second section DPR2 may be a time period in which the image IM is displayed on the display panel DP. The display controller DCP may transmit the data signal DS for displaying the image IM to the display panel DP during the second section DPR2. In an example embodiment, the first driving frame DF of the display panel DP may further include a third section DPR3. The third section DPR3 may also be a time period in which the image IM is not displayed on the display panel DP. The third section DPR3 may lag behind the first section DPR1 within the first driving frame DF. The second section DPR2 may be interposed between the first section DPR1 and the third section DPR3.

In an example embodiment, when the display panel DP operates at a second operating frequency, a second driving frame DF' includes a first section DPR1', a second section DPR2', and a third section DPR3'. The first section DPR1' and the third section DPR3' may each be a time period in which the image IM is not displayed on the display panel DP. The second section DPR2' may be a time period in which the image IM is displayed on the display panel DP.

In an example embodiment, when the second operating frequency is less than the first operating frequency, the duration of the second section DPR2 included in the first driving frame DF is less than the duration of the second section DPR2' included in the second driving frame DF'. In an example embodiment, the duration of the first section DPR1' included in the second driving frame DF' is the same as the duration of the first section DPR1 included in the first driving frame DF. In an example embodiment, the duration of the third section DPR3' included in the second driving frame DF' is the same as the duration of the third section DPR3 included in the first driving frame DF.

The display controller DCP controls the driving of the display panel DP in synchronization with a frequency of the vertical synchronization signal Vsync. When the frequency of the vertical synchronization signal Vsync is a first frequency, the operating frequency of the display panel DP may be the first operating frequency. When the frequency of the vertical synchronization signal Vsync is a second frequency, less than the first frequency, the operating frequency of the display panel DP may be the second operating frequency. In an example embodiment, the first frequency of the vertical synchronization signal Vsync may be the same as the first operating frequency of the display panel DP; and, the second frequency of the vertical synchronization signal Vsync may be the same as the second operating frequency of the display panel DP. Accordingly, the operating frequency of the display panel DP may be determined based on frequency information of the vertical synchronization signal Vsync.

The vertical synchronization signal Vsync includes vertical pulses (VPLS, VPLS'). The vertical pulse VPLS at a point in time when the vertical synchronization signal Vsync has the first frequency may be referred to as the "first vertical pulse VPLS". The vertical pulse VPLS' at a point in time when the vertical synchronization signal Vsync has the second frequency may be referred to as the "second vertical pulse VPLS'". In an example embodiment, a first vertical duration VPW of the first vertical pulse VPLS may be different from a second vertical duration VPW' of the second vertical pulse VPLS'. FIG. 9A illustrates that the second vertical duration VPW' is longer than the first vertical duration VPW. However, the present disclosure is not limited thereto. For example, the second vertical duration VPW' may be shorter than the first vertical duration VPW.

The first vertical duration VPW is less than the duration of the first section DRP1 included in the first driving frame DF. The second vertical duration VPW' is less than the duration of the first section DPR1' included in the second driving frame DF'.

When the display panel DP operates at the first operating frequency, the data enable signal DE includes a first inactivation section DPD1, a first activation section DPD2, and a second inactivation section DPD3. The display controller DCP controls the driving of the display panel DP based on the data enable signal DE. The display controller DCP may not transmit the data signal DS to the display panel DP in the first inactivation section DPD1 and in the second inactivation section DPD3. The display controller DCP may transmit the data signal DS to the display panel DP in the first activation section DPD2.

When the display panel DP operates at the second operating frequency, the data enable signal DE includes a third inactivation section DPD4, a second activation section DPD5, and a fourth inactivation section DPD6. In an example embodiment, when the second operating frequency is less than the first operating frequency, the duration of the second activation section DPD5 is greater than the duration of the first activation section DPD2. In an example embodiment, the duration of the third inactivation section DPD4 is the same as the duration of the first inactivation section DPD1. In an example embodiment, the duration of the fourth inactivation section DPD6 is the same as the duration of the second inactivation section DPD3.

When the display panel DP operates at the first operating frequency, the synchronization signal SYS_a includes a first pulse PLS1_$a$, which is activated in synchronization with the first section DPR1 of the first driving frame DF, and a second pulse PLS2_$a$ activated in synchronization with the second section DPR2 of the first driving frame DF.

In an example embodiment, the first pulse PLS1_$a$ may be generated in synchronization with the first vertical pulse VPLS. The first pulse PLS1_$a$ may have a first duration PLW1_$a$. The first duration PLW1_$a$ may be the same as the first vertical duration VPW of the first vertical pulse VPLS. The second pulse PLS2_$a$ may be generated in synchronization with the first activation section DPD2. A rising edge of the second pulse PLS2_$a$ may be synchronized with a rising edge of the first activation section DPD2. The second pulse PLS1_$a$ may have a first pulse width PLW2_$a$. In an example embodiment, the first section DPR1 may be defined as a section from the rising edge of the first pulse PLS1_$a$ to the rising edge of the second pulse PLS2_$a$. In another example embodiment, the first pulse PLS1_$a$ may be generated in synchronization with the first vertical pulse VPLS; and, the second pulse PLS2_$a$ may be generated after a preset timing from the first vertical pulse VPLS.

When the display panel DP operates at the second operating frequency, the synchronization signal SYS_a includes a third pulse PLS1_$a$', which activated in synchronization with the first section DPR1' of the second driving frame DF', and a fourth pulse PLS2_$a$' activated in synchronization with the second section DPR2' of the second driving frame DF'.

In an example embodiment, the third pulse PLS1_$a$' may be generated in synchronization with the second vertical pulse VPLS'. The third pulse PLS1_$a$' may have a second duration PLW1_$a$'. The second duration PLW1_$a$' may be the same as the second vertical duration VPW' of the second vertical pulse VPLS'. In an example embodiment, the second duration PLW1_$a$' may be different from the first duration PLW1_$a$. The second duration PLW1_$a$' may be greater than the first duration PLW1_$a$.

The fourth pulse PLS2_$a$' may be generated in synchronization with the second activation section DPD5. The rising edge of the fourth pulse PLS2_$a$' may be synchronized with the rising edge of the second activation section DPD5. The fourth pulse PLS2_$a$' may have a second pulse width PLW2_$a$'

In an example embodiment, a time interval between the first pulse PLS1_$a$ and the second pulse PLS2_$a$ may be referred to as a "first time interval PLW3". The first time interval PLW3 may be a time interval that begins at the falling edge of the first pulse PLS1_$a$ and ends at the rising edge of the second pulse PLS2_$a$. A time interval between the third pulse PLS1_$a$' and the fourth pulse PLS2_$a$' may be referred to as a "second time interval PLW3'". The second time interval PLW3' may be a time interval between the falling edge of the third pulse PLS1_$a$' and the rising edge of the fourth pulse PLS2_a'. In an example embodiment, the first time interval PLW3 may be greater than the second time interval PLW3'.

The synchronization signal SYS_a includes the first pulse PLS1_a, which has the first duration PLW1_a during the first driving frame DF of the display panel DP, and the second pulse PLS2_a. The first pulse PLS1_a of the synchronization signal SYS_a may include information about the first operating frequency of the display panel DP. The second pulse PLS2_a of the synchronization signal SYS_a may include information about the start time of the first activation section DPD2 of the display panel DP.

The synchronization signal SYS_a further includes the third pulse PLS1_a', which has the second duration PLW1_a' during the second driving frame DF' of the display panel DP, and the fourth pulse PLS2_a'. The third pulse PLS1_a' of the synchronization signal SYS_a may include information about the second operating frequency of the display panel DP. The fourth pulse PLS2_a' of the synchronization signal SYS_a may include information about the second activation section DPD5 of the display panel DP.

Accordingly, the sensing controller ICP (see FIG. 7) may obtain information about the operating frequency of the display panel DP and information about sections in which the image IM is displayed on the display panel DP, by receiving the synchronization signal SYS_a.

Referring to FIG. 9B, when the display panel DP operates at the first operating frequency, the first driving frame DF includes the first section DPR1, the second section DPR2, and the third section DPR3. When the display panel DP operates at the second operating frequency, the second driving frame DF' includes a first section DPR1", a second section DPR2", and a third section DPR3". Hereinafter, signals the same as the signals described with reference to FIG. 9A are marked by the same reference numerals, and thus, additional description will be omitted to avoid redundancy.

In an example embodiment, when the second operating frequency is less than the first operating frequency, the duration of the second section DPR2 included in the first driving frame DF is less than the duration of the second section DPR2" included in the second driving frame DF'. In an example embodiment, the duration of the first section DPR1" included in the second driving frame DF' is less than the duration of the first section DPR1 included in the first driving frame DF. In an example embodiment, the duration of the third section DPR3" included in the second driving frame DF' is greater than the duration of the third section DPR3 included in the first driving frame DF. However, the present disclosure is not limited thereto. For example, the duration of the first section DPR1" included in the second driving frame DF' may be greater than the duration of the first section DPR1 included in the first driving frame DF. The duration of the third section DPR3 included in the second driving frame DF' may be less than the duration of the third section DPR3 included in the first driving frame DF.

In an example embodiment, a sum of the duration of the first section DPR1 and the duration of the third section DPR3 included in the first driving frame DF may be the same as a sum of the duration of the first section DPR1" and the duration of the third section DPR3" included in the second driving frame DF'.

A vertical synchronization signal Vsync_a includes vertical pulses (VPLS_a, VPLS_a'). The vertical pulse VPLS_a may be referred to as the "first vertical pulse VPLS_a". at a point in time when the vertical synchronization signal Vsync_a has a first frequency The vertical pulse VPLS_a' may be referred to as the "second vertical pulse VPLS_a'" at a point in time when the vertical synchronization signal Vsync_a has a second frequency. In an example embodiment, the first vertical duration VPW_a of the first vertical pulse VPLS_a may be the same as the second vertical duration VPW_a' of the second vertical pulse VPLS_a'.

When the display panel DP operates at the first operating frequency, the data enable signal DE_a includes a first inactivation section DPD1_a, a first activation section DPD2_a, and a second inactivation section DPD3_a. When the display panel DP operates at the second operating frequency, the data enable signal DE_a includes a third inactivation section DPD4_a, a second activation section DPD5_a, and a fourth inactivation section DPD6_a.

In an example embodiment, the duration of the second activation section DPD5_a is greater than the duration of the first activation section DPD2_a. In an example embodiment, the duration of the third inactivation section DPD4_a is less than the duration of the first inactivation section DPD1.a. In an example embodiment, the duration of the fourth inactivation section DPD6_a is greater than the duration of the second inactivation section DPD3_a. However, the present disclosure is not limited thereto, the duration of the third inactivation section DPD4_a may be greater than the duration of the first inactivation section DPD1_a; and, the duration of the fourth inactivation section DPD6_a may be less than the duration of the second inactivation section DPD3_a.

When the display panel DP operates at the first operating frequency, the synchronization signal SYS_c includes a first pulse PLS1_c, which is activated in synchronization with the first section DPR1 of the first driving frame DF, and a second pulse PLS2_c activated in synchronization with the second section DPR2 of the first driving frame DF.

In an example embodiment, the first pulse PLS1_c may be generated in synchronization with the first vertical pulse VPLS_a. The first duration PLW1_c of the first pulse PLS1_c may be the same as the first vertical duration VPW_a of the first vertical pulse VPLS_a. The second pulse PLS2_c may be generated in synchronization with the first activation section DPD2_a. A rising edge of the second pulse PLS2_c may be synchronized with a rising edge of the first activation section DPD2_a.

When the display panel DP operates at the second operating frequency, the synchronization signal SYS_c includes a third pulse PLS1_c', which activated in synchronization with the first section DPR1' of the second driving frame DF', and further includes a fourth pulse PLS2_c' activated in synchronization with the second section DPR2" of the second driving frame DF'.

In an example embodiment, the third pulse PLS1_c' may be generated in synchronization with the second vertical pulse VPLS_a'. A second duration PLW1_c' of the third pulse PLS1_c' may be the same as the second vertical duration VPW_a' of the second vertical pulse VPLS_a'. The fourth pulse PLS2_c' may be generated in synchronization with the second activation section DPD5_a. The rising edge of the fourth pulse PLS2_c' may be synchronized with the rising edge of the second activation section DPD5_a.

In an example embodiment, a time interval between the first pulse PLS1_c and the second pulse PLS2_c is defined as a first time interval PLW3_a and, a time interval between the third pulse PLS1_c' and the fourth pulse PLS2_c' is defined as a second time interval PLW3_b. As shown in FIG. 9B, when the duration of the third inactivation section DPD4_a is less than the duration of the first inactivation section DPD1_*a*, the first time interval PLW3_*a* is greater than the second time interval PLW3_*b*. However, in an example embodiment, when the duration of the third inactivation section DPD4_*a* is greater than the duration of the first inactivation section DPD1_*a*, the first time interval PLW3_*a* is less than the second time interval PLW3_*b*.

The first time interval PLW3_*a* of the synchronization signal SYS_c may include information about the first operating frequency of the display panel DP. The second pulse PLS2_*c* may include information about the first activation section DPD2_*a* of the display panel DP.

The second time interval PLW3_*b* of the synchronization signal SYS_c may include information about the second operating frequency of the display panel DP. The fourth pulse PLS2_*c*' may include information about the second activation section DPD5_*a* of the display panel DP.

Referring once more to FIG. 8, the third generating part GP3 receives the vertical synchronization signal Vsync, the horizontal synchronization signal Hsync, and the data enable signal DE from the first generating part GP1. In an example embodiment, the third generating part GP3 may further receive a main clock from the first generating part GP1. The third generating part GP3 may generate the source driving signal SDS and the gate driving signal GDS based on the vertical synchronization signal Vsync, the horizontal synchronization signal Hsync, and the data enable signal DE. The third generating part GP3 may further generate the emission control signal ECS (see FIG. 4). However, in an example embodiment, the display controller DCP may include a configuration for generating the source driving signal SDS, the gate driving signal GDS, and the emission control signal ECS.

Figure 10A:
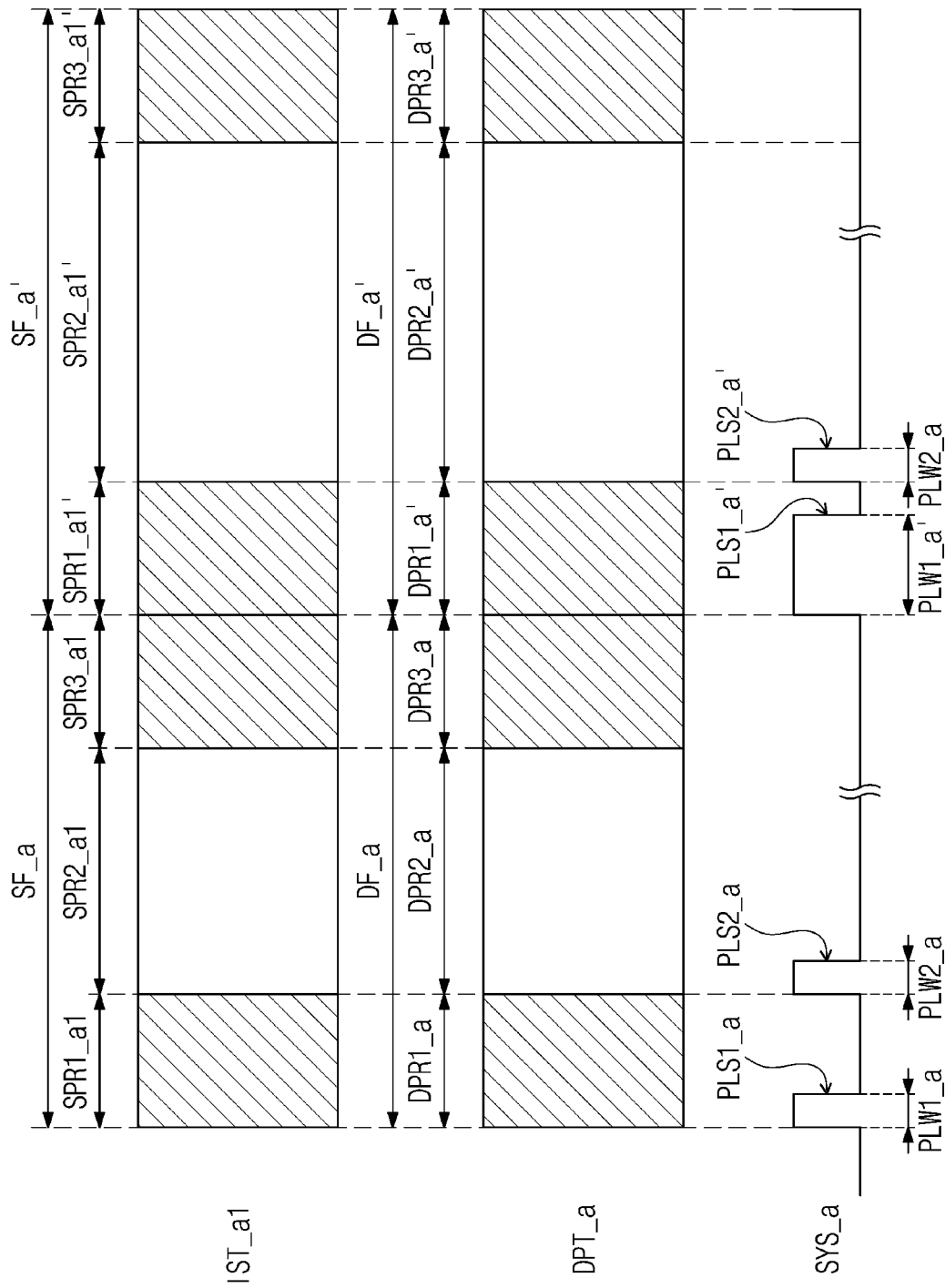
FIGS. 10A to 10C are waveform diagrams that describe determining an operating frequency of an input sensing layer based on a duration of a first pulse, according to an embodiment of the present disclosure.
Figure 10B:
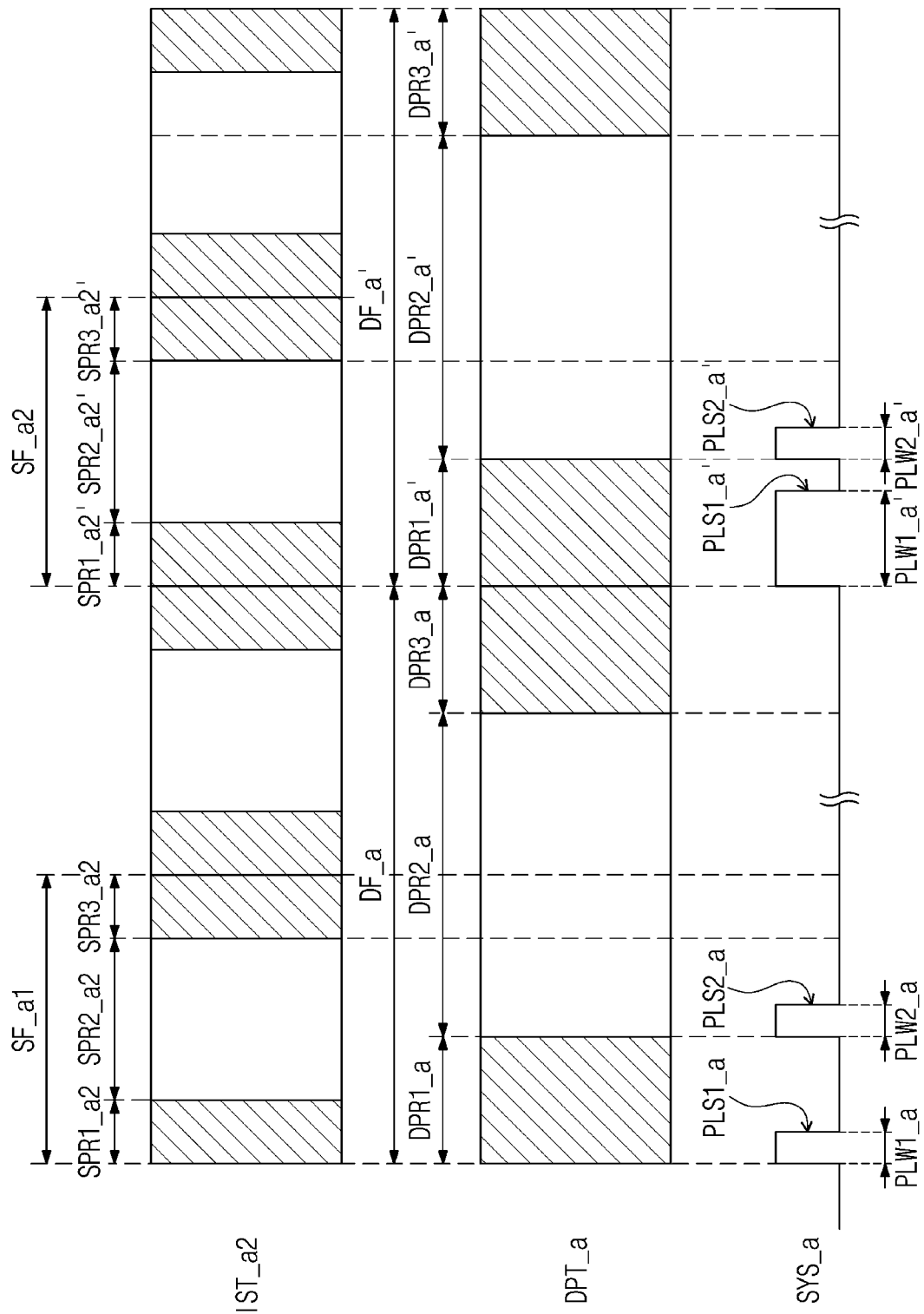
Figure 10C:
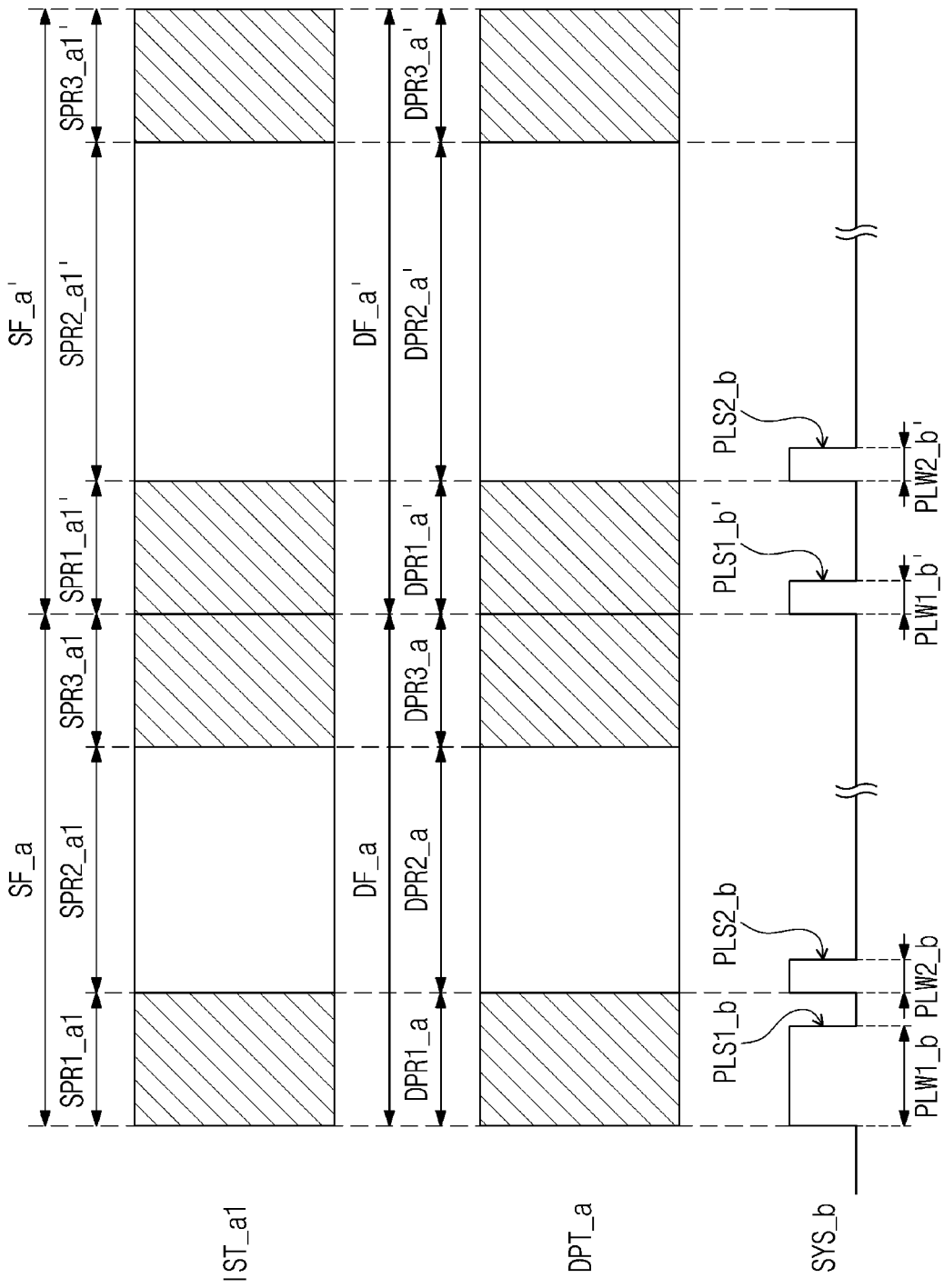

FIGS. 10A to 10C are waveform diagrams that describe determining an operating frequency of an input sensing layer based on a duration of a first pulse, according to an embodiment of the present disclosure. Hereinafter, signals the same as the signals described with reference to FIG. 9A are marked by the same reference numerals, and thus, additional description will be omitted to avoid redundancy.

As illustrated in FIG. 9A, FIGS. 10A and 10B illustrate the synchronization signal SYS_a generated based on the vertical synchronization signal Vsync including vertical pulses (VPLS, VPLS'), the duration of each of which is increased as an operating frequency of the display panel DP (see FIG. 1) decreases, and the data enable signal DE.

FIG. 10A illustrates a driving timing diagram DPT_a of the display panel DP (see FIG. 2) and a driving timing diagram IST_a1 of the input sensing layer ISP (see FIG. 2).

A first driving frame DF_a of the display panel DP includes a first section DPR1_*a* and a third section DPR3_*a*. The image IM (see FIG. 1) is not displayed on the display panel DP during either section. The first driving frame DF_a of the display panel DP includes a second section DPR2_*a* in which the image IM is displayed on the display panel DP.

A second driving frame DF_a' of the display panel DP includes a first section DPR1_*a*' and a third section DPR3_*a*'. An image is not displayed on the display panel DP during either section. The second driving frame DF_a' of the display panel DP includes a second section DPR2_*a*' in which an image is displayed on the display panel DP.

A synchronization signal SYS_a includes information about a first operating frequency and a second operating frequency of the display panel DP. The synchronization signal SYS_a includes information about the second section DPR2_*a* in the first driving frame DF_a of the display panel DP and information about the second section DPR2_*a*' in the second driving frame DF_a' of the display panel DP.

Referring to FIGS. 7 and 10A, the sensing controller ICP determines the operating frequency of the input sensing layer ISP based on the sensing control signal ICS and the synchronization signal SYS. Hereinafter, an embodiment according to FIG. 10A is described in which the sensing control signal ICS includes information that allows the input sensing layer ISP to operate at an operating frequency the same as the operating frequency of the display panel DP.

The first sensing frame SF_a of the input sensing layer ISP includes a first non-sensing section SPR1_a1 and a second non-sensing section SPR3_a1, during each of which the input sensing layer ISP does not detect the external input TC. The first sensing frame SF_a of the input sensing layer ISP includes a sensing section SPR2_a1 in which the input sensing layer ISP detects the external input TC.

The second sensing frame SF_a' of the input sensing layer ISP includes a first non-sensing section SPR1_a1' and a second non-sensing section SPR3_a1', during each of which the input sensing layer ISP does not detect the external input TC. The second sensing frame SF_a' of the input sensing layer ISP includes a sensing section SPR2_a1' in which the input sensing layer ISP detects the external input TC.

In an example embodiment, the sensing controller ICP obtains information about a first operating frequency and a second operating frequency of the display panel DP based on the synchronization signal SYS_a. The sensing controller ICP determines a first operating frequency of the input sensing layer ISP based on the first operating frequency of the display panel DP. The sensing controller ICP determines a second operating frequency of the input sensing layer ISP based on the second operating frequency of the display panel DP.

In an example operation, the sensing controller ICP recognizes that the second operating frequency of the display panel DP is less than the first operating frequency of the display panel DP, based on that second duration PLW1_*a*' is greater than first duration PLW1_*a*. The sensing controller ICP may recognize information about the first operating frequency and second operating frequency of the display panel DP based on the previously stored information about the first operating frequency of the display panel DP corresponding to the first duration PLW1_*a* and the second operating frequency of the display panel DP corresponding to the second duration PLW1_*a*'.

In an example embodiment, the sensing controller ICP obtains information about the second section DPR2_*a* in the first driving frame DF_a of the display panel DP and information about the second section DPR2_*a*' in the second driving frame DF_a' of the display panel DP based on the synchronization signal SYS_a. The sensing controller ICP determines the sensing section SPR2_a1 in the first sensing frame SF_a of the input sensing layer ISP based on information about the second section DPR2_*a* in the first driving frame DF_a of the display panel DP. The sensing controller ICP determines the sensing section SPR2_a1' in the second sensing frame SF_a' of the input sensing layer ISP based on information about the second section DPR2_*a*' in the second driving frame DF_a' of the display panel DP. Accordingly, the sensing controller ICP is synchronized with the display panel DP with each frame.

FIG. 10A illustrates that the second section DPR2_*a* in the first driving frame DF_a is synchronized with the sensing section SPR2_a1 in the first sensing frame SF_a. However, the present disclosure is not limited thereto. For example, the sensing section SPR2_a1 in the first sensing frame SF_a may overlap the first section DPR1_*a* in the first driving frame DF_a. FIG. 10A illustrates that the second section DPR2_a' in the second driving frame DF_a' is synchronized with the sensing section SPR2_a1' in the second sensing frame SF_a'. However, the present disclosure is not limited thereto. The sensing section SPR2_a1' in the second sensing frame SF_a' may overlap the first section DPR1_a' in the second driving frame DF_a'.

FIG. 10B illustrates a driving timing diagram IST_a2 of the input sensing layer ISP when the operating frequency of the input sensing layer ISP is greater than the operating frequency of the display panel DP. Hereinafter, an embodiment is described with reference to FIG. 10B in which the sensing control signal ICS includes information that allows the input sensing layer ISP to operate at twice the operating frequency of the display panel DP.

The first sensing frame SF_a1 of the input sensing layer ISP includes a first non-sensing section SPR1_a2 and a second non-sensing section SPR3_a2, during each of which the input sensing layer ISP does not detect the external input TC. The first sensing frame SF_a1 of the input sensing layer ISP includes a sensing section SPR2_a2 in which the input sensing layer ISP detects the external input TC.

The second sensing frame SF_a2 of the input sensing layer ISP includes a first non-sensing section SPR1_a2 and a second non-sensing section SPR3_a2', during each of which the input sensing layer ISP does not detect the external input TC. The second sensing frame SF_a2 of the input sensing layer ISP includes a sensing section SPR2_a2' in which the input sensing layer ISP detects the external input TC.

In an example embodiment, two first sensing frames SF_a1 may be repeated during the first driving frame DF_a. During the second driving frame DF_a', two second sensing frames SF_a2 may be repeated. Accordingly, in the embodiment illustrated in FIG. 10B in which there are two sensing frames for every driving frame, the sensing controller ICP is still synchronized with the display panel DP with each frame.

In an example embodiment, the first non-sensing section SPR1_a2 and the sensing section SPR2_a2 of the first sensing frame SF_a1 may overlap the first section DPR1_a of the first driving frame DF_a. The second non-sensing section SPR3_a2 of the first sensing frame SF_a1 may overlap the second section DPR2_a of the first driving frame DF_a. The first non-sensing section SPR1_a2' and the sensing section SPR2_a2' of the second sensing frame SF_a2 may overlap the first section DPR1_a' of the second driving frame DF_a'. The second non-sensing section SPR3_a2' of the second sensing frame SF_a2 may overlap the second section DPR2_a' of the second driving frame DF_a'.

FIG. 10C illustrates a synchronization signal SYS_b generated based on a vertical synchronization signal including vertical pulses (VPLS, VPLS'). As an operating frequency of the display panel DP decreases, the duration of each of the vertical pulses VPLS and VPLS' is decreased. Hereinafter, signals the same as the signals described with reference to FIG. 10A are marked by the same reference numerals, and thus, additional description will be omitted to avoid redundancy.

The sensing controller ICP obtains information about a first operating frequency and a second operating frequency of the display panel DP based on the synchronization signal SYS_b. The sensing controller ICP recognizes that the first operating frequency of the display panel DP is greater than the second operating frequency of the display panel DP, based on that first duration PLW1_b is greater than second duration PLW2_b'. The sensing controller ICP may recognize information about the first operating frequency and second operating frequency of the display panel DP based on the previously stored information about the first operating frequency of the display panel DP corresponding to the first duration PLW1_b and the second operating frequency of the display panel DP corresponding to the second duration PLW1_b'.

Figure 11A:
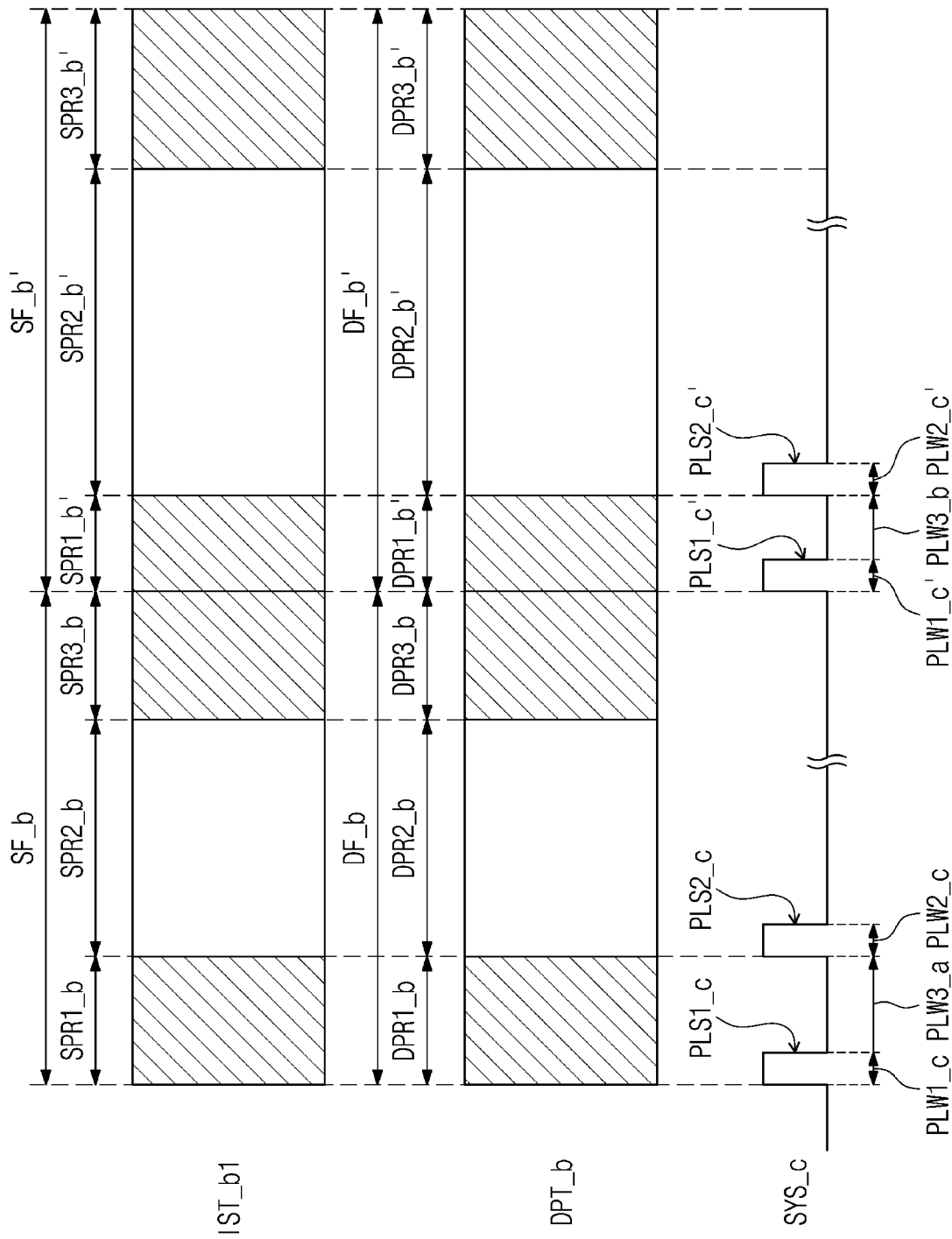
FIGS. 11A and 11B are waveform diagrams that describe determining an operating frequency of an input sensing layer based on an interval between a first pulse and a second pulse, according to an embodiment of the present disclosure.
Figure 11B:
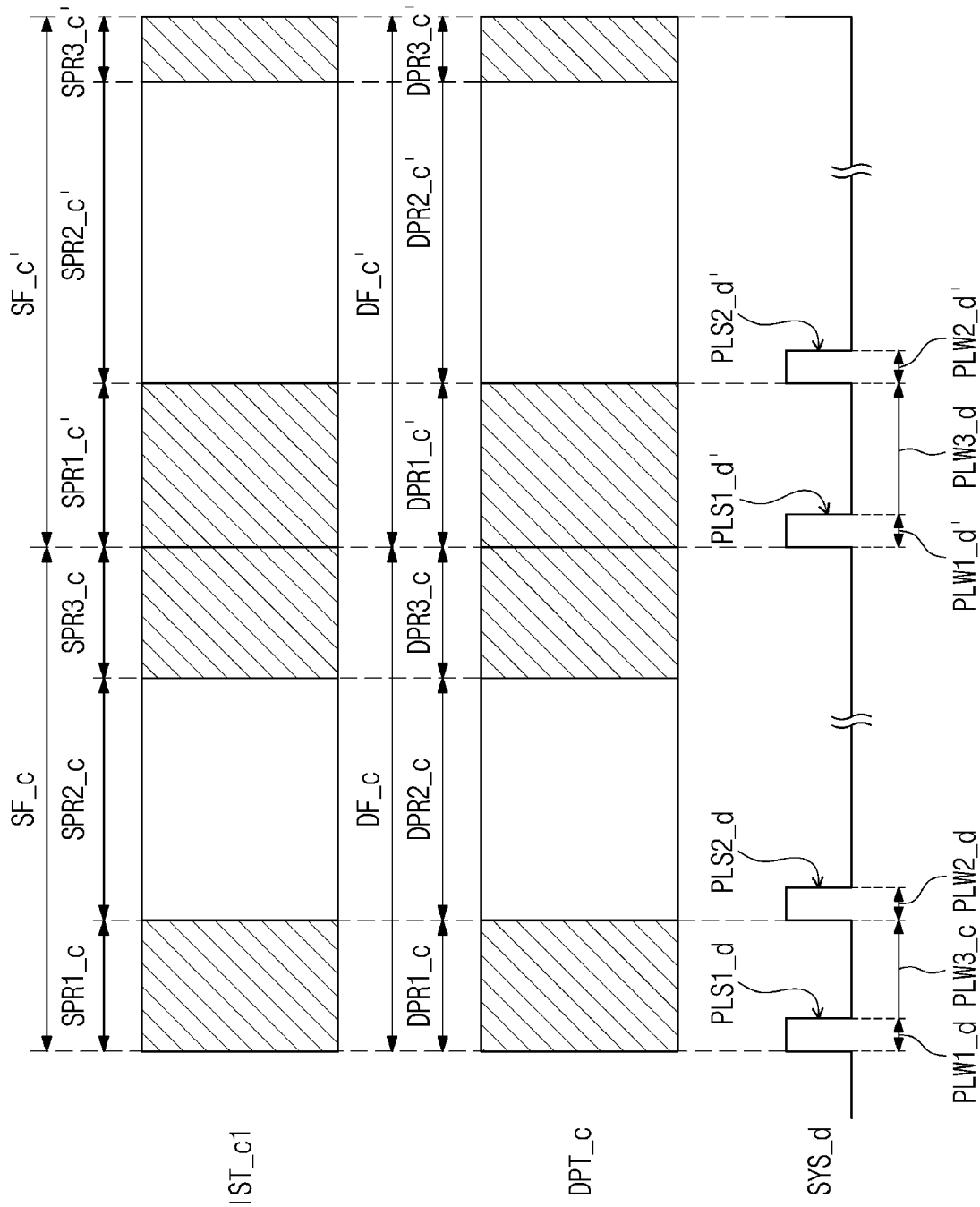

FIGS. 11A and 11B are waveform diagrams that describe determining an operating frequency of an input sensing layer based on an interval between a first pulse and a second pulse, according to an embodiment of the present disclosure.

As illustrated in FIG. 9B, FIG. 11A illustrates a synchronization signal SYS_c generated based on a vertical synchronization signal Vsync_a and a data enable signal DE_a having the duration of the first inactivation section DPD1_a greater than the duration of the third inactivation section DPD4_a.

A first driving frame DF_b of the display panel DP includes a first section DPR1_b and a third section DPR3_b, during each of which the image IM (see FIG. 1) is not displayed on the display panel DP. The first driving frame DF_b of the display panel DP includes a second section DPR2_b in which the image IM is displayed on the display panel DP.

A second driving frame DF_b' of the display panel DP includes a first section DPR1_b' and a third section DPR3_b', during each of which the image IM is not displayed on the display panel DP. The second driving frame DF_b' of the display panel DP includes a second section DPR2_b' in which the image IM is displayed on the display panel DP.

The synchronization signal SYS_c includes information about a first operating frequency and a second operating frequency of the display panel DP. The synchronization signal SYS_c includes information about the second section DPR2_b in the first driving frame DF_b of the display panel DP and information about the second section DPR2_b" in the second driving frame DF_b' of the display panel DP. Hereinafter, an example embodiment according to FIG. 11A is described in which the sensing control signal ICS (see FIG. 7) includes information that allows the input sensing layer ISP to operate at an operating frequency the same as the operating frequency of the display panel DP.

A first sensing frame SF_b of the input sensing layer ISP includes a first non-sensing section SPR1_b and a second non-sensing section SPR3_b, during each of which the input sensing layer ISP does not detect the external input TC (see FIG. 7). The first sensing frame SF_b of the input sensing layer ISP includes a sensing section SPR2_b in which the input sensing layer ISP detects the external input TC.

A second sensing frame SF_b' of the input sensing layer ISP includes a first non-sensing section SPR1_b' and a second non-sensing section SPR3_b', during each of which the input sensing layer ISP does not detect the external input TC. The second sensing frame SF_b' of the input sensing layer ISP includes a sensing section SPR2_b' in which the input sensing layer ISP detects the external input TC.

In an example embodiment, the sensing controller ICP obtains information about a first operating frequency and a second operating frequency of the display panel DP based on the synchronization signal SYS_c. The sensing controller ICP determines a first operating frequency of the input sensing layer ISP based on the first operating frequency of the display panel DP. The sensing controller ICP determines a second operating frequency of the input sensing layer ISP based on the second operating frequency of the display panel DP. Accordingly, the sensing controller ICP is synchronized with the display panel DP with each frame.

The sensing controller ICP recognizes that the first operating frequency of the display panel DP is greater than the second operating frequency of the display panel DP, based on that a first time interval PLW3_a is greater than a second time interval PLW3_b. The sensing controller ICP may recognize information about the first operating frequency and second operating frequency of the display panel DP based on the previously stored information about the first operating frequency of the display panel DP corresponding to the first time interval PLW3_a and the second operating frequency of the display panel DP corresponding to the second time interval PLW3_b.

FIG. 11B illustrates a synchronization signal SYS_d generated based on a vertical synchronization signal and a data enable signal having the duration of the first inactivation section DPD1_a less than the duration of the third inactivation section DPD4_a.

A first driving frame DF_c of the display panel DP includes a first section DPR1_c and a third section DPR3_c, during each of which the image IM is not displayed on the display panel DP. The first driving frame DF_c of the display panel DP includes a second section DPR2_c in which the image IM is displayed on the display panel DP.

A second driving frame DF_c' of the display panel DP includes a first section DPR1_c' and a third section DPR3_c', during each of which the image IM is not displayed on the display panel DP. The second driving frame DF_c' of the display panel DP includes a second section DPR2_c' in which the image IM is displayed on the display panel DP.

The synchronization signal SYS_d includes information about a first operating frequency and a second operating frequency of the display panel DP. The synchronization signal SYS_d includes information about the second section DPR2_c in the first driving frame DF_c of the display panel DP and information about the second section DPR2_c' in the second driving frame DF_c' of the display panel DP. Hereinafter, an example embodiment is described with reference to FIG. 11B in which the sensing control signal ICS includes information that allows the input sensing layer ISP to operate at an operating frequency the same as the operating frequency of the display panel DP.

A first sensing frame SF_c of the input sensing layer ISP includes a first non-sensing section SPR1_c and a second non-sensing section SPR3_c, during each of which the input sensing layer ISP does not detect the external input TC. The first sensing frame SF_c of the input sensing layer ISP includes a sensing section SPR2_c in which the input sensing layer ISP detects the external input TC.

A second sensing frame SF_c' of the input sensing layer ISP includes a first non-sensing section SPR1_c' and a second non-sensing section SPR3_c', during each of which the input sensing layer ISP does not detect the external input TC. The second sensing frame SF_c' of the input sensing layer ISP includes a sensing section SPR2_c' in which the input sensing layer ISP detects the external input TC.

In an example embodiment, the sensing controller ICP obtains information about a first operating frequency and a second operating frequency of the display panel DP based on the synchronization signal SYS_d. The sensing controller ICP determines a first operating frequency of the input sensing layer ISP based on the first operating frequency of the display panel DP. The sensing controller ICP determines a second operating frequency of the input sensing layer ISP based on the second operating frequency of the display panel DP.

The sensing controller ICP recognizes that the first operating frequency of the display panel DP is greater than the second operating frequency of the display panel DP, based on that a first time interval PLW3_c is less than a second time interval PLW3_d. The sensing controller ICP may recognize information about the first operating frequency and second operating frequency of the display panel DP based on the previously stored information about the first operating frequency of the display panel DP corresponding to the first time interval PLW3_c and the second operating frequency of the display panel DP corresponding to the second time interval PLW3_d.

Accordingly, the technical scope of the present disclosure is not limited to the detailed description of this specification, but should be defined by the claims.

According to an embodiment of the present disclosure, it is possible to determine an operating frequency of an input sensing layer based on a synchronization signal, which includes information about an operating frequency of a display panel and information about a timing at which an image is displayed on the display panel. In this way, the input sensing layer may be driven by reflecting a driving operation of the display panel with a single synchronization signal. Accordingly, a display device of the present disclosure may remove the need for other synchronization signals and excess electrical connections or pins, and may have increased touch input accuracy and reduced noise between input sensing layers and display layers.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a display panel configured to display an image;
an input sensing layer disposed on the display panel and configured to detect an external input;
a display controller configured to drive the display panel and to output a synchronization signal including information about an operating frequency of the display panel; and
a sensing controller configured to receive the synchronization signal from the display controller and to determine an operating frequency of the input sensing layer based on the synchronization signal,
wherein the display panel is driven in a sequence according to driving frames, and wherein a driving frame of the display panel includes:
a first section in which the image is not displayed on the display panel; and
a second section in which the image is displayed on the display panel, and
wherein the synchronization signal includes a first pulse corresponding to a timing of the first section, and a second pulse corresponding to a timing of the second section.

2. The display device of claim 1, wherein the sensing controller determines the operating frequency of the input sensing layer based on a duration of the first pulse.

3. The display device of claim 2, wherein, when the display controller drives the display panel at a first operating frequency, the duration of the first pulse is a first duration,
wherein, when the display controller drives the display panel at a second operating frequency lower than the first operating frequency, the duration of the first pulse is a second duration, and wherein the first duration is different from the second duration.

4. The display device of claim 3, wherein the first duration is greater than the second duration.

5. The display device of claim 3, wherein the first duration is less than the second duration.

6. The display device of claim 1, wherein the sensing controller determines the operating frequency of the input sensing layer based on a time interval between the first pulse and the second pulse.

7. The display device of claim 6, wherein, when the display controller drives the display panel at a first operating frequency, a time interval between a rising edge of the first pulse and a rising edge of the second pulse is a first time interval, wherein, when the display controller drives the display panel at a second operating frequency lower than the first operating frequency, the time interval between a rising edge of the first pulse and a rising edge of the second pulse is a second time interval, and wherein the first time interval is different from the second time interval.

8. The display device of claim 7, wherein the first time interval is greater than the second time interval.

9. The display device of claim 7, wherein the first time interval is less than the second time interval.

10. The display device of claim 1, wherein the driving frame of the display panel further includes a third section in which the image is not displayed on the display panel, and wherein the third section is generated after the first section, and the second section is between the first section and the third section.

11. The display device of claim 1, wherein the first section is a period from a rising edge of the first pulse to a rising edge of the second pulse.

12. The display device of claim 1, wherein the second section begins in synchronization with a rising edge of the second pulse.

13. The display device of claim 1, wherein a sensing frame of the input sensing layer includes:

a non-sensing section in which the input sensing layer does not detect the external input; and a sensing section in which the input sensing layer detects the external input, wherein the non-sensing section corresponds to the first section, and wherein the sensing section corresponds to the second section.

14. The display device of claim 1, wherein the display controller controls driving of the display panel based on a vertical synchronization signal and a data enable signal, and generates the synchronization signal based on the vertical synchronization signal and the data enable signal.

15. The display device of claim 1, wherein the display panel includes:

a base layer;

a display element layer disposed on the base layer and including a plurality of pixels; and an encapsulation layer disposed on the display element layer, wherein the input sensing layer is directly disposed on the encapsulation layer.

16. A display device comprising:

a display panel configured to display an image;

an input sensing layer disposed on the display panel and configured to detect an external input;

a display controller configured to drive the display panel according to a vertical synchronization signal and to output a synchronization signal based on the vertical synchronization signal; and a sensing controller configured to receive the synchronization signal from the display controller and to determine an operating frequency of the input sensing layer based on the synchronization signal, wherein the synchronization signal includes operating frequency information and image display timing information.

17. The display device of claim 16, wherein a driving frame of the display panel includes:

a first section in which the image is not displayed on the display panel; and a second section in which the image is displayed on the display panel, wherein the synchronization signal includes a first pulse corresponding to a timing of the first section, and a second pulse corresponding to a timing of the second section.

18. The display device of claim 17, wherein the sensing controller determines the operating frequency of the input sensing layer based on duration of the first pulse.

19. The display device of claim 17, wherein the sensing controller determines the operating frequency of the input sensing layer based on an interval between the first pulse and the second pulse.

20. The display device of claim 16, wherein the operating frequency of the input sensing layer is greater than the operating frequency of the display panel.

* * * * *